US010638289B2

United States Patent
Di Girolamo et al.

(10) Patent No.: US 10,638,289 B2
(45) Date of Patent: Apr. 28, 2020

(54) SERVICE LAYER MOBILITY MANAGEMENT OF APPLICATIONS

(71) Applicant: Convida Wireless, LLC, Wilmington, DE (US)

(72) Inventors: Rocco Di Girolamo, Laval Quebec (CA); Quang Ly, North Wales, PA (US); Dale N. Seed, Allentown, PA (US); Zhuo Chen, Claymont, DE (US); William Robert Flynn, IV, Schwenksville, PA (US); Catalina Mihaela Mladin, Hatboro, PA (US); Shamim Akbar Rahman, Cote St. Luc (CA)

(73) Assignee: Convida Wireless, LLC, Wilmington, DE (US)

( * ) Notice: Subject to any disclaimer, the term of this patent is extended or adjusted under 35 U.S.C. 154(b) by 207 days.

(21) Appl. No.: 15/726,954

(22) Filed: Oct. 6, 2017

(65) Prior Publication Data
US 2018/0103337 A1    Apr. 12, 2018

Related U.S. Application Data

(60) Provisional application No. 62/404,941, filed on Oct. 6, 2016.

(51) Int. Cl.
*H04W 4/70*    (2018.01)
*H04L 29/08*   (2006.01)
(Continued)

(52) U.S. Cl.
CPC ............. *H04W 4/70* (2018.02); *H04L 61/303* (2013.01); *H04L 67/12* (2013.01); *H04W 8/08* (2013.01);
(Continued)

(58) Field of Classification Search
CPC ........ H04W 4/70; H04W 8/08; H04L 61/303; H04L 61/306; H04L 61/6004
See application file for complete search history.

(56) References Cited

U.S. PATENT DOCUMENTS

| | | | |
|---|---|---|---|
| 2011/0099227 A1 | 4/2011 | Walls et al. | |
| 2012/0106431 A1* | 5/2012 | Wu | H04W 4/00 370/312 |

(Continued)

FOREIGN PATENT DOCUMENTS

EP    2945326 A1    11/2015

OTHER PUBLICATIONS

PMIPv6: A Network-Based Localized Mobility Management Solution—The Internet Protocol Journal, vol. 13, No. 3, Sep. 2010, 6 pages.
(Continued)

*Primary Examiner* — Duc C Ho
(74) *Attorney, Agent, or Firm* — BakerHostetler

(57) ABSTRACT

Some services offered by M2M service layers will have contact information that will be used in order to interact with applications. For example, a service layer may need to send notification messages to an application. To do this, the service layer relies on stored contact information to know how to reach the application. If the device hosting the application moves and the application changes its contact information, then the contact information that is in the service layer is stale. As a result, these services will be inefficient, or in some cases, fail altogether. Embodiments described herein provide systems and methods to enable mechanisms to update stale contact information in M2M service layers.

20 Claims, 27 Drawing Sheets

(51) Int. Cl.
  *H04L 29/12* (2006.01)
  *H04W 8/08* (2009.01)
(52) U.S. Cl.
  CPC ........ *H04L 61/306* (2013.01); *H04L 61/6004* (2013.01)

(56) References Cited

U.S. PATENT DOCUMENTS

2015/0033312 A1* 1/2015 Seed ................. H04W 4/70
                                                      726/7
2016/0219125 A1   7/2016 Xiao
2017/0353944 A1* 12/2017 Kim .................. H04W 72/005

OTHER PUBLICATIONS

OneM2M White Paper "The Interoperability Enabler for the Entire M2M and IoT Ecosystem" Jan. 2015, 14 pages.
OneM2M Technical Specification TS-0001-V2.10.0 "Functional Architecture" Aug. 30, 2016, 427 pages.
Cisco IOS IP Configuration Guide, Release 12.2, Feb. 12, 2014, 47 pages.
Chan, et al., "Requirements for Distributed Mobility Management" Internet Engineering Task Force (IETF) RFC: 7333, Aug. 2014, 24 pages.
3GPP TS36.300 V12.9.0 "Evolved Universal Terrestrial Radio Access (E-UTRA) and Evolved Universal Terrestrial Radio Access Network (E-UTRAN_ Overall Description State 2 (Release 12)", Mar. 2016, 254 pages.

* cited by examiner

SERVICE LAYER MOBILITY MANAGEMENT OF APPLICATIONS

CROSS REFERENCE TO RELATED APPLICATIONS

This application claims benefit of U.S. Provisional Patent Application Ser. No. 62/404,941, filed Oct. 6, 2016, the disclosure of which is hereby incorporated by reference as if set forth in its entirety.

BACKGROUND

The potential benefit of M2M has resulted in a number of sector specific or vertical applications to enable machines to communicate with each other. For example one finds solutions in the healthcare sector, the energy sector, and the automotive sector. These solutions have been optimized for these vertical applications, but fail to deliver on the promise of the all-encompassing IoT, where machines and things from different vertical applications interact with each other.

To this end, a number of standards bodies (for example oneM2M) are developing service layers that define a single horizontal platform for the exchange and sharing of data among all applications, even those from different industry sectors.

From a protocol stack perspective, service layers are typically situated above the application protocol layer and provide value added services to applications. Hence service layers are often categorized as 'middleware' services. For example, FIG. 1 shows an example service layer 102 between an IP network stack 106 and applications 104.

An M2M service layer can provide applications and devices access to a collection of M2M-oriented capabilities (M2M services) supported by the service layer. These capabilities are made available to applications via Application Programming Interfaces (APIs). For example, an M2M service layer may maintain massive amounts of M2M data, which can be discovered, retrieved, or subscribed-to by M2M applications (provided these M2M applications have suitable access rights). Additional examples of M2M services that can be provided by the service layer include security, charging, device management, provisioning, and connectivity management.

A typical M2M deployment (shown in FIG. 2) will have a number entities/nodes that provide various levels of M2M service functionality. In non-limiting example:

M2M servers 202, which host M2M services and are operated by an M2M service provider;
  M2M middle nodes (or gateways) 204, 206, 208, 210 and 212 which host M2M services
  M2M devices which host M2M services 214, 216, 218, 220, 222, 224; and
  "Light" M2M devices which typically host no M2M services 226, 228 and 230.

M2M applications which can either reside on these entities or have access to these entities through a network, take advantage of the provided M2M services. As shown in the FIG. 2, these M2M services can be provided locally, for instance, M2M application1 can use the local M2M services provided by the M2M Device1 to provide data storage. In addition, the M2M services may also be provided remotely. For instance M2M application2 can use the services provided by the M2M server to make its data discoverable. Note that the M2M services deployment shown is inherently hierarchical, and this is typical of M2M service layers described in oneM2M and ETSI M2M.

oneM2M is one standard development organization (SDO) that is targeting the creation of an M2M service layer. oneM2M describes its service layer as a distributed software layer akin to an operating system. This distributed software layer is implemented in a common services layer that sits between the M2M applications and the communication hardware (HW)/software (SW) that provides data transport.

The Common Services Layer provides a set of standardized M2M services which are grouped together, by functionality, into Common Services Functions (CSFs). A number of instantiated CSFs makeup a Common Services Entity (CSE) 302. As shown in FIG. 3, these service layers (CSEs) 302 interface with:

applications (Application Entities or AEs 304 in oneM2M nomenclature) through an Mca reference point;
  other service layers (CSEs), through an Mcc (or Mcc') reference point;
  the underlying networks (Network Service Entity or NSE 306 in oneM2M nomenclature) through an Mcn reference point.

Also shown in FIG. 3 are twelve CSFs that are currently defined by oneM2M. Each of the CSFs are briefly described below:

Application and Service Layer Management CSF: provides management of AEs and CSEs. This includes capabilities to configure, troubleshoot and upgrade functions of the CSE, as well as to upgrade the AEs
  Discovery CSF: searches for information about applications and services based on a filter criteria.
  Registration CSF: Provides the functionality for AEs (or other remote CSEs) to register with a CSE. This allows the AEs (or the remote CSE) to use the services of the CSE.
  Communication Management/Delivery Handling CSF: provides communications with other CSEs, AEs and NSEs. This CSF decides at what time and which communication connection for delivering communications and if necessary and allowed, to buffer communications request so that they can be forwarded at a later time.
  Group Management CSF: provides for the handling of group related requests. Enables an M2M system to support bulk operations on multiple devices, applications, etc.
  Security CSF: provides security functions for the service layer, such as access control including identification, authentication, and authorization.
  Data Management and Repository CSF: provides data storage and mediation functions (collecting data for aggregation, re-formatting data, and storing data for analytics and semantic processing).
  Location CSF: provides the functionality to enable AEs to obtain geographical location information.
  Service Charging & Accounting CSF: provides charging functions for the service layer
  Device Management CSF: provides management of device capabilities on M2M gateways and M2M devices.
  Network Service Exposure, Service Execution and Triggering CSF: manages communications with the Underlying Networks for accessing network service functions
  Subscription and Notification CSF: provides functionality to allow for subscribing to an event and to be notified when this event occurs.

oneM2M is developing the service layer architecture, called Resource Oriented Architecture (ROA) shown in FIG. 4.

In ROA, the architecture is developed around resources. The CSFs operate on these resources to perform their service. A resource is a uniquely addressable element in the architecture having a representation that can be manipulated via RESTful methods such as CREATE. RETRIEVE, UPDATE, and DELETE. These resources are made addressable using Uniform Resource Identifiers (URIs). A resource may contain child resource(s) and attribute(s). A child resource is a resource that has a containment relationship with a parent resource. As a result, resources can be viewed as a hierarchical tree, stemming from a base resource. The parent resource representation contains references to its child resources(s). The lifetime of a child-resource is limited by the parent's resource lifetime. Each resource supports a set of "attributes" that store information related to the resource. A set of attributes are common to all resources, while others apply only to specific resources. The latter are referred to as "resource specific attributes".

Within the ROA of oneM2M, there is a distinction between resources hosted in the oneM2M service layer, and entities which interact with the oneM2M system. At the service layer all interactions are initiated by entities (AEs or CSEs) through a request operation, and these requests always target a resource. The response to each of these requests is always between two entities. As a consequence, within the M2M service provider domain, each resource needs to be identified by a unique resource ID, and each entity (AE and CSE) needs to be identified by a unique entity ID. Additional, non-limiting, details are provided below:

CSE Identifier (CSE-ID): This ID identifies a CSE, and is used for all interactions from/to a CSE. Service providers assign a relative CSE-ID to each CSE, which is unique within the service provider domain. The relative CSE-ID can be made globally unique by prefixing a unique M2M Service Provider ID.

Application Entity Identifier (AE-ID): This is used to uniquely identify "an AE resident on an M2M Node, or an AE that requests to interact with an M2M Node" oneM2M-TS-0001, oneM2M Functional Architecture-V-2.6.0. In order to use the M2M services offered by the oneM2M service layer, applications must first register to a CSE. During this registration request, the application entity can either request a service provider assigned AE-ID (assigned by the IN-CSE) or a 'locally' assigned AE-ID (assigned by the CSE the application is registering with, also known as the registrar CSE). If assigned by the IN-CSE, the AE-ID is unique within the service provider domain. In such a case, the AE-ID starts with an 'S' character. In contrast, if the AE-ID is assigned by the Registrar CSE, it is only unique among all applications registered to this CSE. In such a case, the AE-ID starts with a 'C' character. Locally assigned AE-ID can be made unique within the service provider domain, by prefixing the CSE-ID of the Registrar CSE.

Resource ID: Most resource IDs are assigned by the CSE that is hosting the resource. The CSE may assign an unstructured ID or a structured ID. An unstructured ID is a sequence of characters that uniquely identifies the resource within the hosting CSE. In contrast, a structured ID identifies the resource within the CSE through its parent-child-relationships. It is very similar to how filenames are identified by their path, in an operating system directory structure. The resource ID can be made unique within the service provider domain, by prefixing the CSE-ID of the hosting CSE. In such a case, the ID is referred to as "Service Provider Relative Resource ID". In particular, this ID uniquely identifies the resource within the M2M service provider domain as well as the CSE where the resource is hosted. In addition, any Resource ID can be made globally unique by prefixing a unique M2M Service Provider ID. In such a case, the ID is referred to as "Absolute Resource ID". One important caveat about the M2M resource IDs is that they carry no routing information. So for example, FIG. 5 shows an absolute resource identifier. This resource:

Is located within the service provider domain with M2M Service Provide ID='www.m2mprovider2.com', Is located within CSE with CSE-ID=CSE001, Is located under resource '/AE1/'

Has resource name 'cont001'

What is important, is that the resource is not located on the server with FQDN www.m2mprovider2.com. Rather it is located on the server hosting CSE with CSE-ID CSE001. In oneM2M, the routing information of this server is maintained in a Point of Access (PoA) attribute which provides the routable location of this CSE. Note however that the PoA may include another FQDN which denotes server hosting the CSE with CSE-ID CSE001.

FIGS. 6A-6B show examples of interactions within the oneM2M domain. In the figures, entities are shown as boxes and resources as ovals within those boxes. All service layer interactions defined in oneM2M, are through a request/response exchange between an Originator and a Receiver. The Originator may be an AE or CSE, and the Receiver is typically a CSE (see FIG. 6A). This is for interactions that involve the creation, retrieval, update, or deletion of a resource (implemented through CREATE, RETRIEVE, UPDATE, or DELETE requests). However oneM2M has defined one interaction where the Receiver is an AE (see FIG. 6B). This is the notification interaction, which is implemented through a NOTIFY request.

As shown in FIG. 6A, when the receiver is a CSE, the request originates from an entity, and may target a specific resource on the receiver CSE. Responses, in contrast, originate from a Receiver entity 604 and target an Originator entity 602. Notice that the request arrow points to a specific resource, while all other arrows begin and end at the entities. As can be seen in the figure, these arrows point to an Originator or Receiver and not to a resource. In the figure, this is denoted by the arrows terminating at the edges of the boxes and not at resources within the boxes.

As shown in FIG. 6B, the situation is slightly different for a NOTIFY request to an AE. In such a case, the request from the Originator 602 needs to target the resource that "represents" the AE. This corresponds to the <AE> child resource created on a registrar CSE, when an AE registers to this CSE (this <AE> child resource is shown in green in FIG. 6B). If the registrar CSE 606 receives a NOTIFY request targeting the <AE> resource, the CSE knows to re-target this to the registered AE.

In order to use services provided by a service layer, AEs and CSEs must first register to that service layer. This is done through specialized CREATE operations targeting the registrar CSE.

Application registration has at least the following objectives:

1. Assign an AE-ID to the application;
2. Create an <AE> resource on the registrar CSE to be used to represent/communicate with the application within the service layer.

Additionally the application has the choice of having the AE-ID assigned by the local registrar CSE or of having the service provider involved in this assignment. If it selects the former, the AE-ID is unique with the registrar CSE, but not globally unique within the service provider domain. If the application selects the latter, then the service provider will assign the AE-ID and, in addition, the IN-CSE will announce the <AE> resource (in an <AEAnnc> resource). This announcement allows the application to be discovered by other applications or CSEs. When the AE-ID is assigned by the service provider, it is guaranteed to be globally unique within the service provider domain.

To distinguish between the two types of AE-IDs, oneM2M uses a single character prefix in the AE-ID. Namely, The AE-ID starts with a 'C' character if it is assigned by the local registrar CSE.

The AE-ID starts with an 'S' character if it is assigned by the service provider.

The use of the service provider assigned AE-ID, allows the service layer to know when an application is attempting a re-registration (say because it has lost connectivity or that its initial registration has expired).

A number of M2M services defined by oneM2M result in interactions with AEs. These are briefly explained in greater detail below.

Subscribe/Notify is a procedure which allows an Originator to subscribe to a resource, and to have notifications sent when certain criteria related to this resource have been met. The Originator creates a subscription to a resource, by:
1) Creating a <subscription> child resource;
2) Providing the criteria which are to be monitored (defined in eventNotificationCriteria attribute). For example an event may be triggered if the size of the resource falls below a threshold, if the resource is updated or deleted, if the resource has a new child resource, or if one of the resources child resources is deleted;
3) Providing a list of notification targets (defined in notificationURI attribute). This is where the CSE hosting the subscription resource needs to send the notifications of the events (through a NOTIFY Request/Response exchange). Each target in the list can be formatted as a oneM2M compliant Resource ID, or as an identifier compliant with a oneM2M supported protocol binding;
4) Providing other notification related policies. For example, the originator may:
    Limit the maximum number of notifications to be sent (defined in expirationCounter attribute);
    Request batch notifications (defined in batchNotify attribute): and/or
    Limit the rate at which notifications are sent (defined in rateLimit attribute).

A typical subscription example is shown in FIG. 7. A subscriber 702 makes a subscription request to the CSE hosting the subscribed-to resource (Step 1). If the Hosting CSE 704 accepts the request, it creates the <subscription> child resource (Step 2) and responds to the subscriber informing it that the subscription has been successful (Step 3). Subsequently, when there is a change in the subscribed-to resource that matches the subscriber specified criteria (Step 4), the Hosting CSE 704 will send a notification to all targets on the notification target list (Step 5 & Step 6). As the receiver in Step 6 is an AE (AE1) 708, the notification is sent to AE1s Registrar CSE 706, which is responsible for re-targeting the notification to AE1 (Step 8,9,10). Note that some details of the subscribe/notify procedure have been omitted to simplify the figure—namely the details regarding subscription verification that occurs during Step 2.

In oneM2M, requests can be of three types: Blocking, Non-Blocking Synchronous, and Non-Blocking Asynchronous. Each type defines how the Originator and intermediate CSEs deal with the request as it travels to its destination. In particular, a Non-Blocking Asynchronous request is used in cases where the Originator, or other entities that need to know about the outcome of a request, are able to receive notification messages. That is, "the CSE carrying out the requested operation may send an unsolicited message to the Originator or to other indicated entities at an arbitrary time to send the status and result of the requested operation to one or more Notification Target(s)". The Originator issues a request to a CSE, and in this request primitive includes the list of notification targets (entities) that are to be informed of the response. A simple call flow is depicted in FIG. 8, which shows an Originator 802 attempting to UPDATE a resource on a Hosting CSE 704 and to send a response to this request to CSE1 and AE1 (Step 1). The Hosting CSE 704 stores the target information (Step 2) and responds back to the Originator 802 that the request has been accepted (Step 3). After the processing related to the resource update is complete, the Hosting CSE 704 uses a NOTIFY request to inform the targets (Step 5 & Step 6). Note that for Step 6 the target is an AE 708, so the response is first sent to the AEs registrar CSE 706, which then retargets the response to the AE 708.

The service layer may assist originators in sending a group request to a set of destination resources. These destination resources are typically of the same type, although there is a provision to allow for mixed resource types. As an example, a group can be created to allow an operation to fan out to a number of <AE> resources.

To achieve this, a <group> resource needs to be created at a group Hosting CSE. The <group> resource contains a list of resource IDs of all the members of the group (included in the memberIDs attribute). At group creation, the group Hosting CSE creates a virtual resource (<fanOutPoint>) as a child of the group resource. Subsequently, an originator may send a request operation targeting the virtual <fanOutPoint> resource, and the group Hosting CSE will, on behalf of the originator, fan out the request to the individual members of the group (those listed in the memberIDs attribute). Upon receiving the responses from each of the fanned out requests, the group Hosting CSE will aggregate the results before responding to the originator.

The service layer may assist originators in announcing resources to remote CSEs. When an originator creates an original resource on a Hosting CSE, it can request that this resource be announced to a remote CSE. The resource created in the remote CSE is referred to as an announced resource. The announced resource may have a set of attributes which are mirrors of the original resource attributes, and it may also have its own attributes—in particular a "link" attribute that points back to the original resource. Announcing a resource has two main purposes:
1) Assisting in discovery—An original resource may be discovered through its announced resource. In fact, oneM2M takes this a step further, as it allows retrieving the original resource through the remote CSE, through the "link" attribute. In this case, it is the responsibility of the remote CSE to retrieve the original resource on the Hosting CSE.
2) Mirroring attributes at remote CSEs—These attributes may be retrieved directly from the remote CSE. It is the responsibility of the original Hosting CSE to make sure that the attributes in the original Hosting CSE and the remote CSE are synchronized.

A number of resource types can be announced—including AE, container, contentInstance, group, and remoteCSE.

Mobility management is an area of very active study in academia and industry—mainly to address the proliferation of mobile devices and the demands of the users using these devices. It enables:

Location Management: Allows a network to locate a mobile's point of attachment in order to deliver traffic to this mobile Handoff Management: Allows a mobile to maintain its connection as it continues to change its point of attachment.

FIG. 9 shows an example of a mobile node as it changes its point of attachment—from one LTE base station to another, than to a WCDMA base station, and finally to a WiFi access point.

Mobility management can be handled at many different layers of the protocol stack. For example, it may be handled at the network layer, through enhancements to IP and/or at the link layer, through mechanisms that rely on the radio access networks to maintain connectivity to a mobile as the mobile changes its point of attachment. Both mechanisms are described below, as well as Distributed Mobility Management (DMM) which is an approach that does not rely on use of mobility anchors.

The basic principle behind Mobile IP (MIP), is to have a mobile node (MN) preserve its IP address, but to use a Care of Address (CoA) as it moves out of its home network and into a foreign network. In each network, the mobile communicates through a router (either a Home router or a Foreign router). Three main functions are required to implement the new functionality:

Router (Agent) Discovery: Routers periodically advertise their presence, or mobile node can send an advertisement solicitation to discover these routers. If a mobile node finds that it is on a foreign network, the foreign router assigns it a CoA.

Registration: Mobile Node registers its CoA with its Home Router, which then updates its Mobility Binding Table. At same time, the Foreign Agent Router keeps a list of visiting mobile nodes—the Visitor list.

Forwarding: For mobile node outgoing traffic, this follows normal IP routing. For mobile node incoming traffic, the data goes first to the mobile node's Home Router, which acts as an anchor for the communication. The Home Router uses the Mobility Binding Table to determine that mobile node is in a foreign network. It sends the data to the CoA through a tunnel created between itself and the foreign router. The Foreign router determines that the mobile node is on its local network by cross-referencing with the Visitor list that it is maintaining, and then delivers the traffic to the mobile node.

As described below, MIP requires changes to both the mobile nodes and the routers/agents. There was a strong operator push to move all the changes to the network side. PMIPv6, based on Mobile IPv6 (MIPv6), reuses the Home Router concept but defines nodes in the network that must signal the changes in the location of a Mobile Node on its behalf. The Mobile Access Gateway (MAG) performs the mobility-related signaling on behalf of the Mobile Nodes attached to its access links. The Local Mobility Anchor (LMA), within the core network, maintains a collection of routes for each Mobile Node connected to the mobility domain. It is an anchor point for traffic destined to a MN MNs attach to a first MAG using Router Solicitation. The MAG then notifies the LMA associating its address to the identity of MN. The LMA allocates a prefix to MN and establishes a tunnel with the MAG. The MAG forwards the prefix to MN so that MN can configure its address.

As MN moves and contacts a new MAG, the new MAG updates the LMA with the new MN location. It also advertises the same prefix to the MN—so MN has same address as it moves.

Downlink packets sent to the Mobile Node from outside, arrive to the LMA, which forwards them through the tunnel to the serving MAG. The MAG, sends the packets to the Mobile Node directly through the access link.

Uplink packets that originate from the Mobile Node are sent from the MAG, through the tunnel, to the LMA, which then forwards the packets to the destination.

In the LTE network, mobility is mobile assisted but network controlled. Mobility occurs when a mobile node changes its point of attachment from one source base station to a target base station. If the two base stations belong to the same Serving Gateway (S-GW), LTE relies on link layer mobility. The basic premise is to use the S-GW as the anchor point to forward traffic from the source base station to the target base station. This is enabled through the following basic steps:

Step 1: The mobile provides measurements to the source base station, which may trigger a handover.

Step 2: The source base station prepares the handover by transferring the mobile context to the target base station and forwarding data traffic between the source base station and target base station.

Step 3: The source base station informs the mobile to perform the handover, at which point the mobile disconnects from source base station and connects to target base station. Once connected it confirms the handover request to the target base station.

Step 4: During transfer, the S-GW acts as a mobility anchor point moving traffic to source base station and then to target base station.

All the solutions described in Network Layer Mobility and Link layer Mobility (LTE Network), have at least the following aspects in common:

Location information in terms of mapping between session identifier and forwarding is kept is a single mobility anchor, and Packets destined to this session identifier are forwarded by this anchor.

It is recognized herein that there is an IETF effort to find alternatives to centralized management for the following reasons:

These anchor points become funnels—there are few in the network and they may become heavily loaded;

These anchor points become single points of failure; and/or

In many cases, networks are getting flatter—they are moving away from hierarchical deployments.

As a result, the IETF has developed DMM, where the mobility management functions are distributed to multiple networks, thereby allowing a mobile mode to be served by a nearby function with an appropriate Forward Management Capability (FMC).

SUMMARY

Some services offered by M2M service layers will have contact information that will be used in order to interact with applications. For example, a service layer may need to send notification messages to an application. To do this, the service layer relies on stored contact information to know how to reach the application. If the device hosting the application moves and the application changes its contact information, then the contact information that is in the service layer is stale. As a result, these services will be inefficient, or in some cases, fail altogether.

Mechanisms to address the above problem, among others, and to update the stale contact information in the M2M service layers are described herein. In order to do this, the mechanisms can rely on the M2M server to propagate the new contact information. Although the problems and solutions are presented with regards to application entities (AEs) moving, they are also applicable to cases where a service layer may be moving and changing its contact information.

Systems and methods introduced herein to handle stale AE contact information in the service layer, are briefly summarized below, in non-limiting example:

A mechanism whereby the M2M server evaluates a re-registration attempt as an AE mobility event, transfers active/ongoing M2M services, updates all local AE contact information, and notifies all other service layers about a change in AE contact information;

A mechanism by which a local service layer evaluates a re-registration attempt as an AE mobility event and notifies the M2M server about the change in contact information;

A modified discovery method using search criteria based on AE contact information;

A mechanism by which a local service layer maintains a resource with all AE contact information;

A mechanism by which an M2M server maintains a master list of all AE contact information for each service layer. The M2M server updates this list based on add and remove requests from the service layers; and An enhanced subscription mechanism where an Originator can request the monitoring of an event that is not tied to a resource. For example an AE Mobility Event.

In addition, this application also includes embodiments for implementing these mechanisms and enhancements in oneM2M, and provides a graphical user interface that allows to monitor/display the AE contact information, and to trigger certain of the mechanisms listed above.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION

Figure 1:
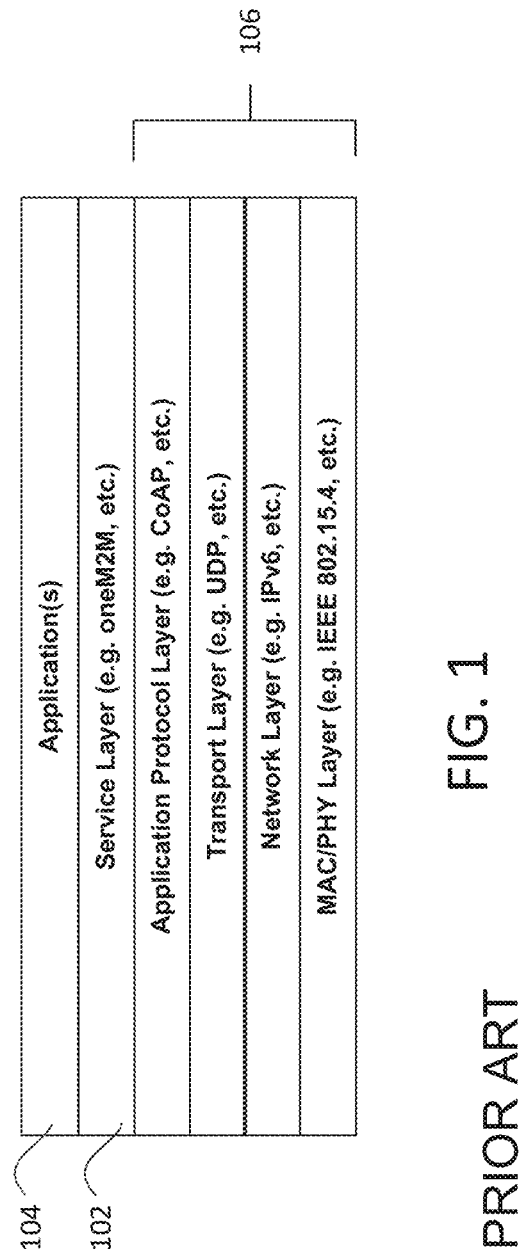
FIG. 1 is a diagram that illustrates an Example Protocol Stack Supporting a Service Layer.
Figure 2:
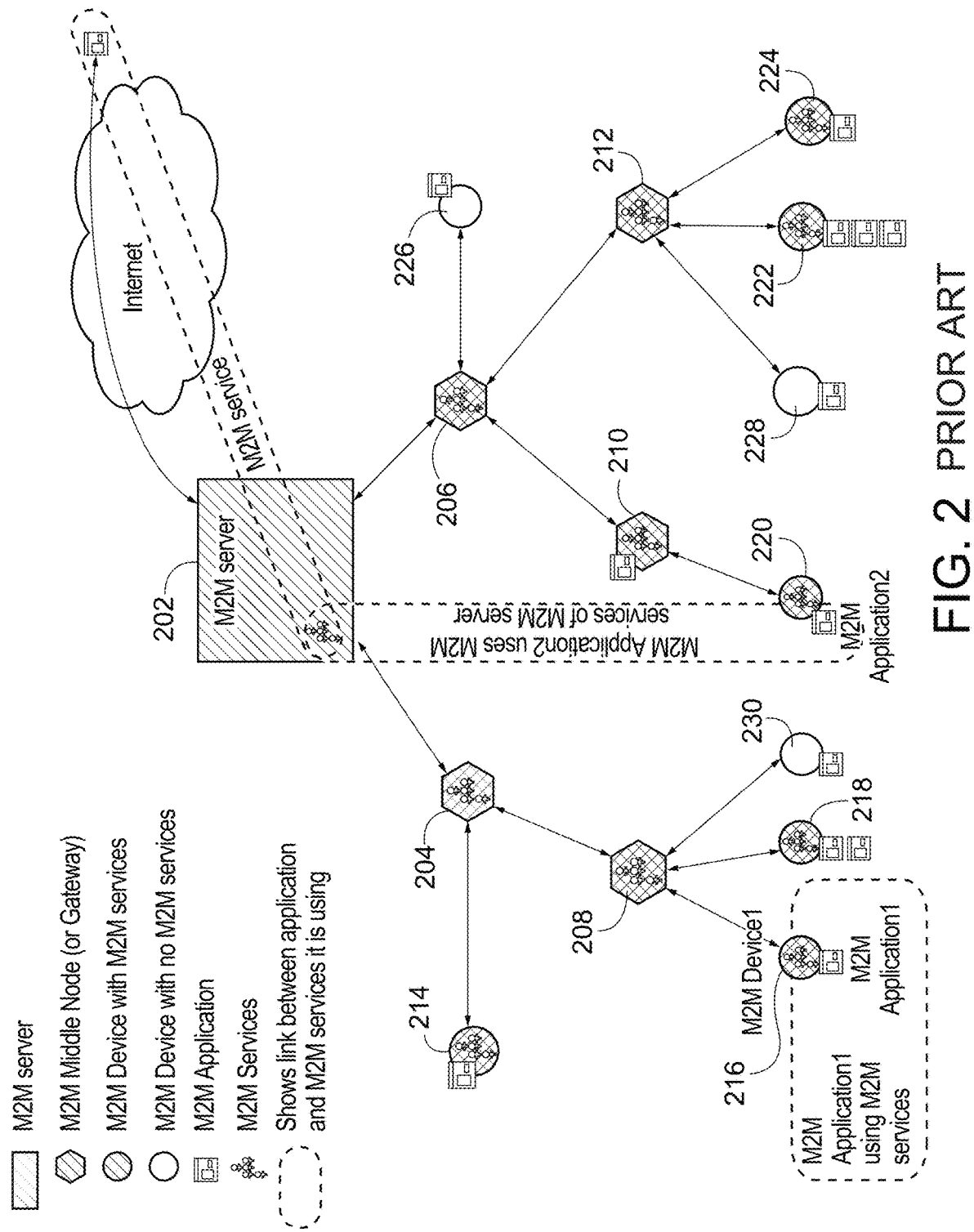
FIG. 2 is a diagram that illustrates an typical M2M Deployment with Distributed M2M Services.
Figure 3:
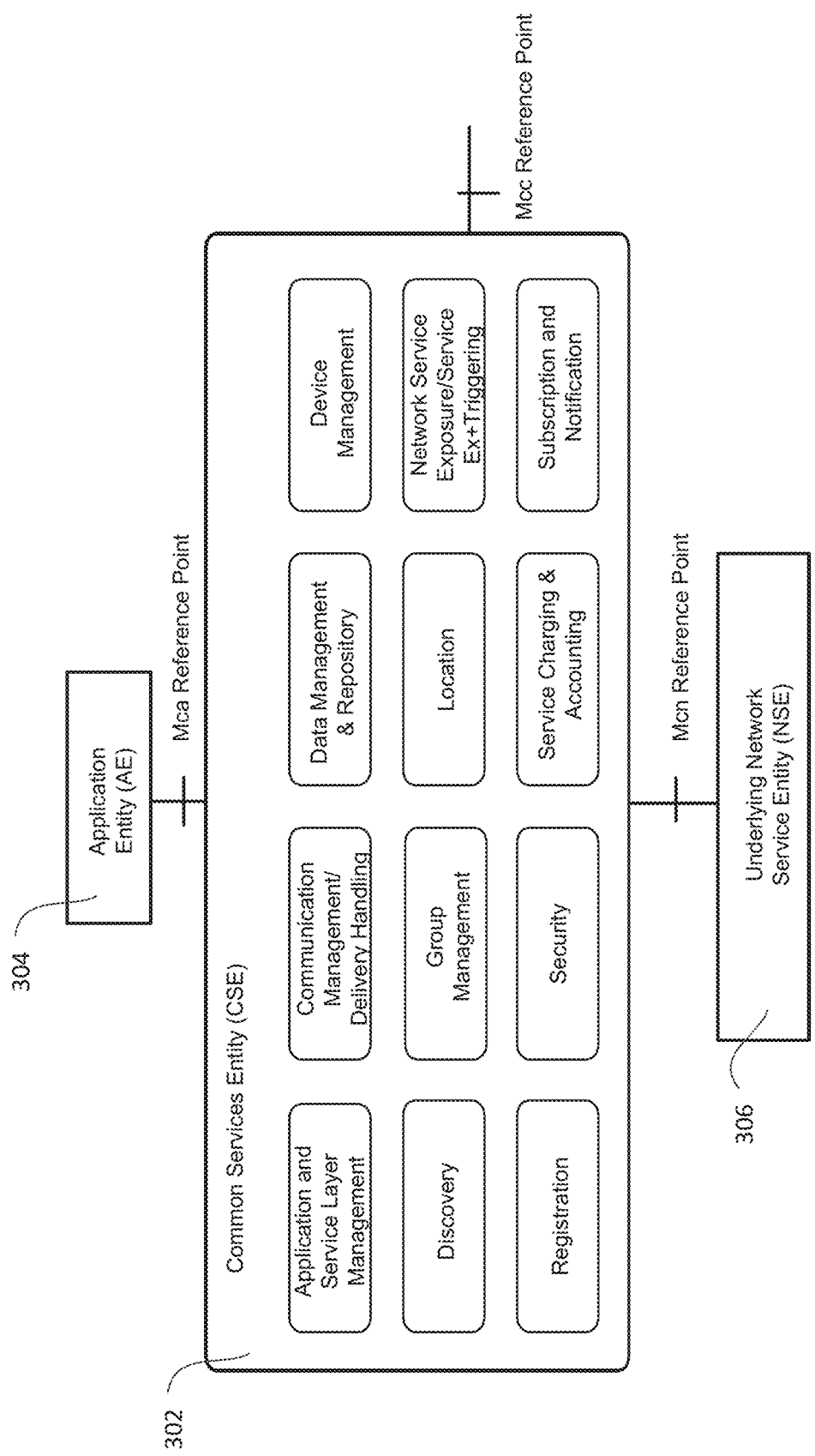
FIG. 3 is a diagram that illustrates Common Services Functions.
Figure 4:
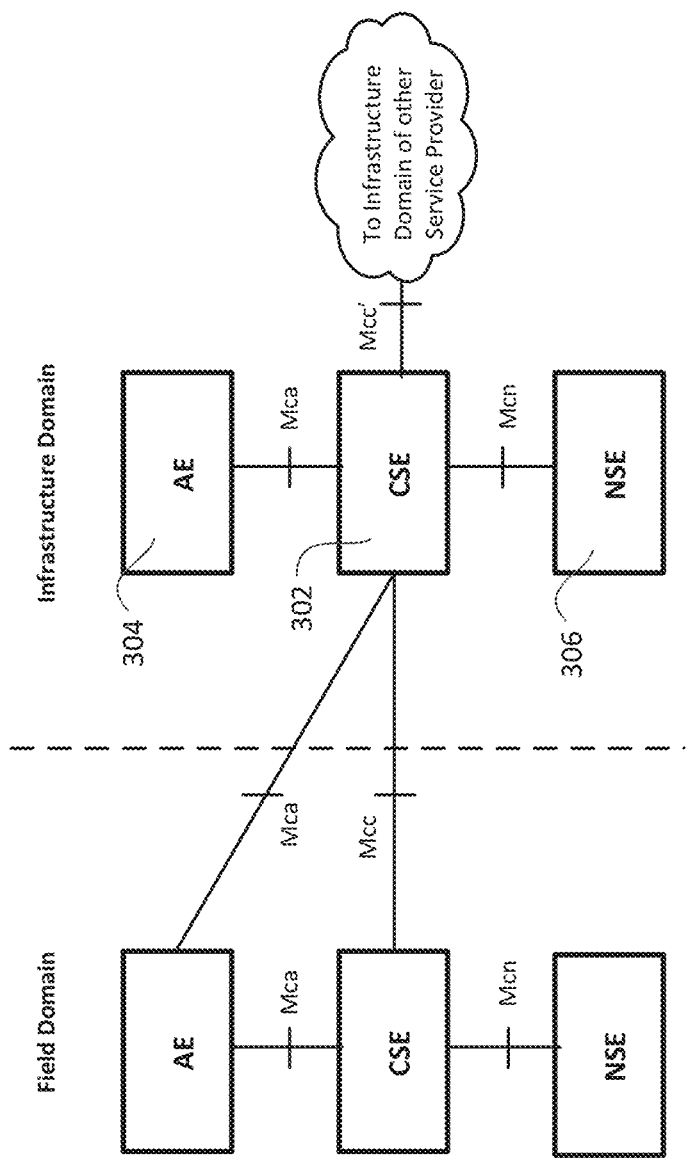
FIG. 4 is a diagram that illustrates a oneM2M Resource Oriented Architecture.
Figure 5:
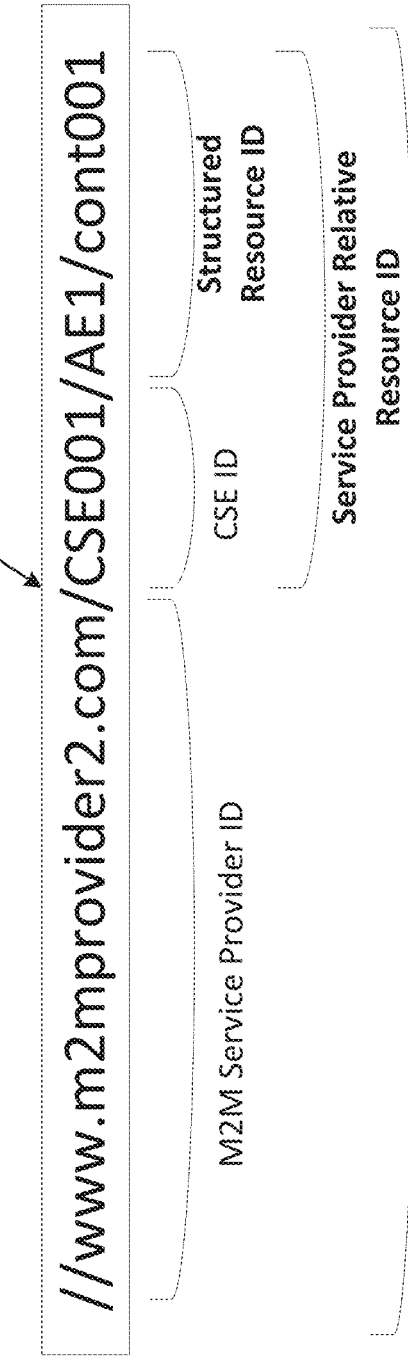
FIG. 5 is a diagram that illustrates Resource IDs.
Figure 6A:
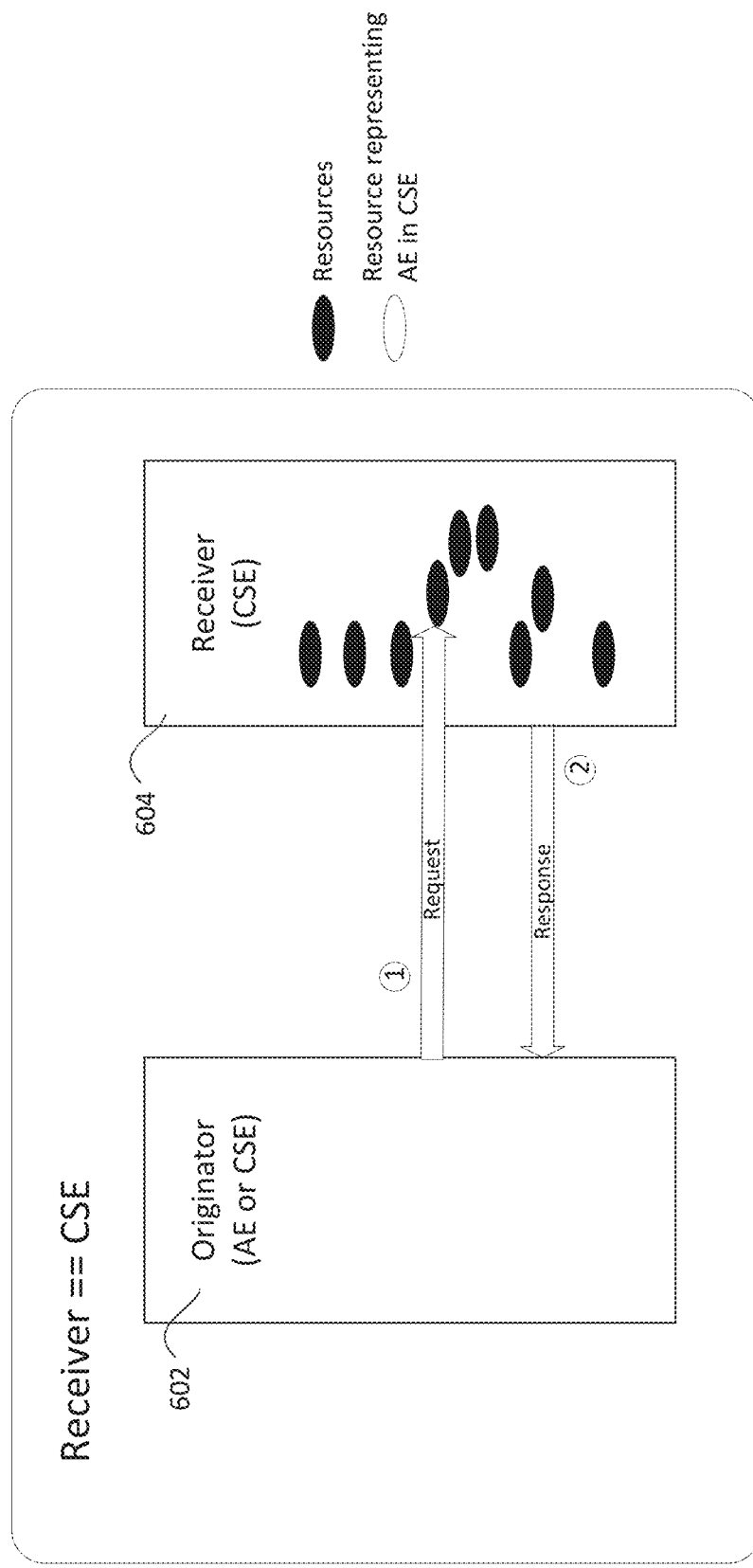
FIGS. 6A-B are diagrams that illustrate Resources, Entities, and AE Re-Targeting.
Figure 6B:
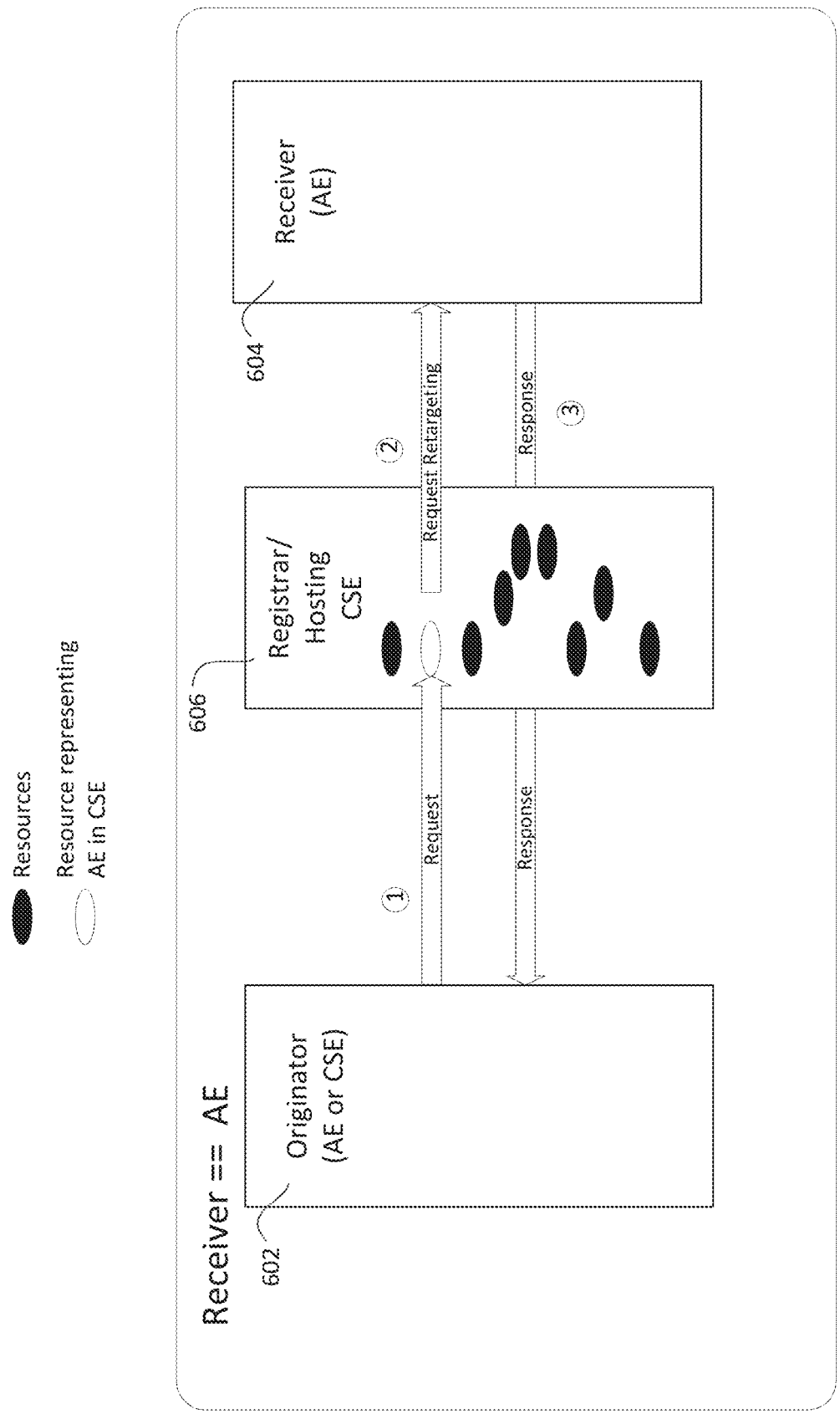
Figure 7:
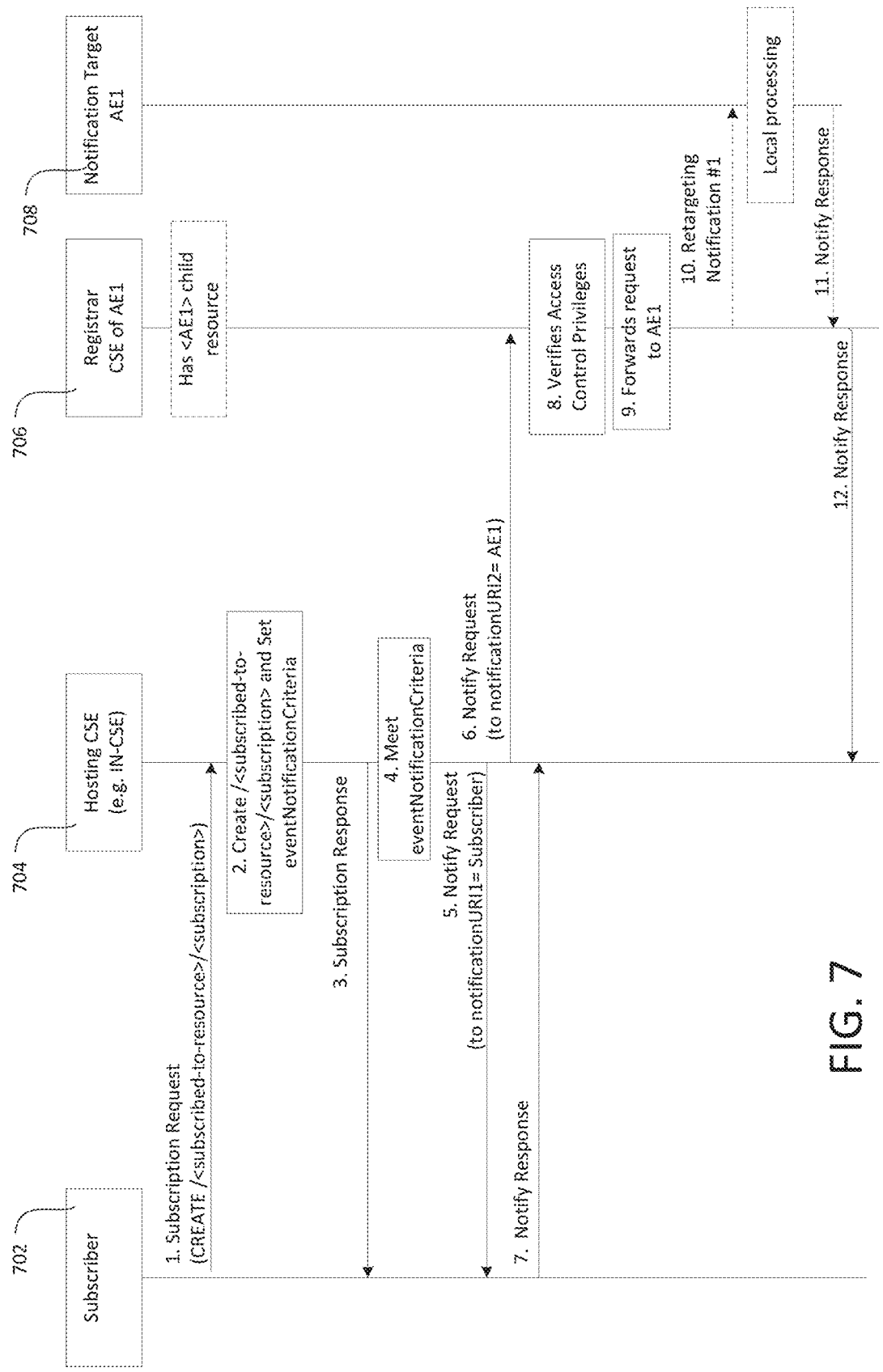
FIG. 7 is a diagram that illustrates Subscribe/Notify.
Figure 8:
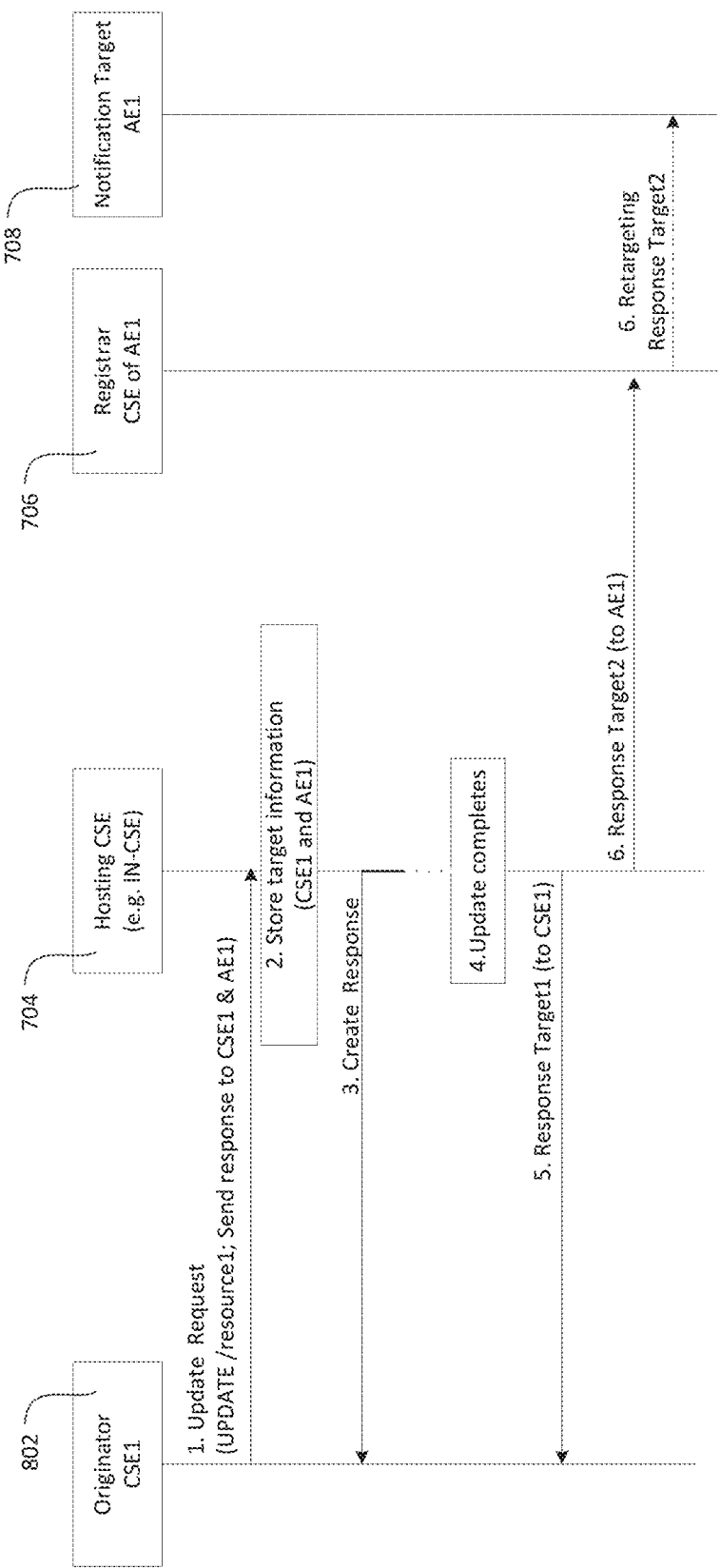
FIG. 8 is a diagram that illustrates a Non-Blocking Asynchronous Request.
Figure 9:
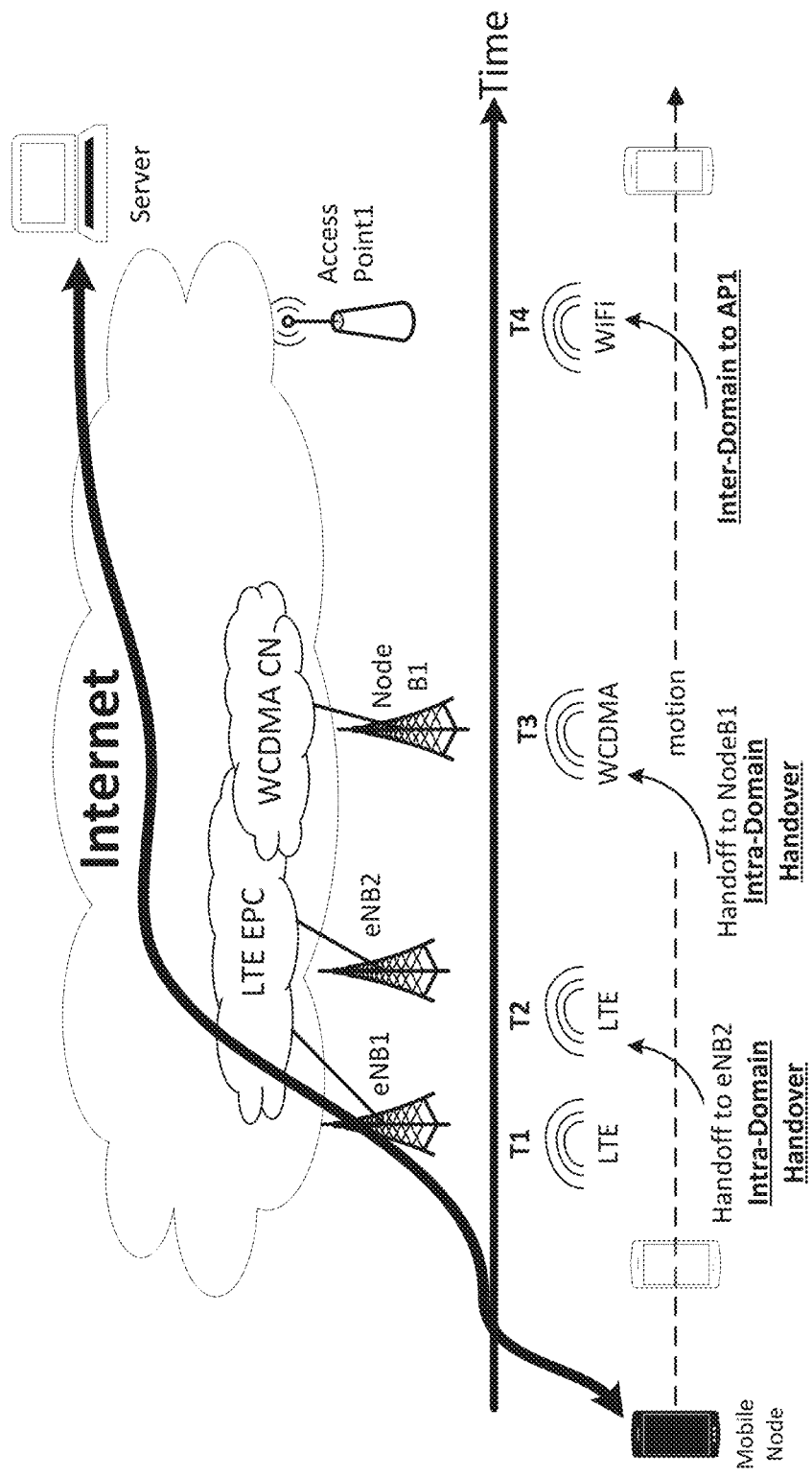
FIG. 9 is a diagram that illustrates a Mobility Management.
Figure 10:
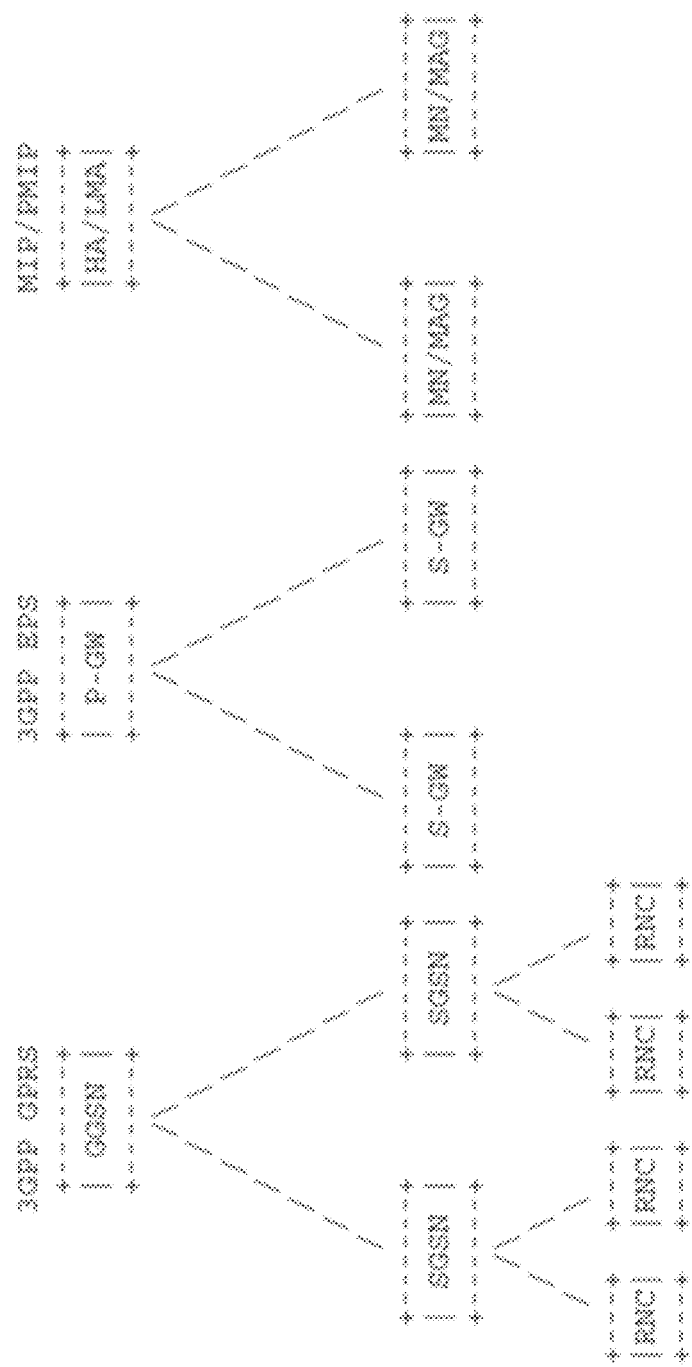
FIG. 10 is a diagram that illustrates a High-Level view of Mobility Management.

Unless otherwise specified, the following definitions are used herein.

Active/Ongoing M2M Services At any one time, a service layer provides active/ongoing services to M2M applications and other service layers. For instance, when an M2M application requests that a service layer notify it about a change in a specific resource hosted in the service layer, then the service layer is said to be providing an ongoing subscription service to the M2M application. Other potential services may include discovery, registration, group operations, etc.

AE Contact Information AE Contact Information can refer to the service layer through which an application is accessible. The contact information can be tied to the service layer at which the application is registered. For example, in the service layer can be defined by oneM2M, the AE contact information refers to the Uniform Resource Identifier of the <AE> resource. The form of the Uniform Resource Identifier could be hierarchical or non-hierarchical.

AE Mobility Event AE Mobility Event can be an event characterized by an AE changing its Registrar CSE Announced Resource An original resource may be announced (published) to a remote CSE. The resource at the remote CSE can be known as an announced resource. The announced resource can be linked to the original resource and can maintain some of the attributes of the original resource.

Common Services Entity Common Services Entity is an oneM2M term for an instantiation of a set Common Service Functions.

Common Services Function Common Services Function is a oneM2M term for a Service Capability. Capabilities/ Functionalities that reside in the common Service Layer.

Hosting CSE Hosting CSE is a CSE which hosts various resources (oneM2M name for a Hosting Node)

M2M Service M2M Service is an M2M oriented capabilities that are provided to applications, typically through Application Program Interfaces M2M Service Node M2M Service Node is a network node hosting a service layer supporting one or more service capabilities for M2M communication.

Middle Node CSE Middle Node CSE is a CSE in a middle node.

Middle Node Middle Node is a node between the Originator and the Hosting CSE

Mobility Mobility refers to a physical node changing its point of attachment in a network and potentially changing its IP address. For example a smartphone connecting to a new base station. As a result of mobility, an AE residing on a node may undergo an AE Mobility Event. Such an event results in a change to the AE contact information.

Original Resource Original Resource is a created resource hosted in a CSE. An original resource may be announced to a remote CSE Service Capability Service Capability is a specific type of service supported by a service layer Service Layer Service Layer is a software middleware layer that sits between M2M applications and communication HW/SW that provides data transport. It provides commonly needed functions for M2M applications across different industry segments Receiver CSE Receiver CSE is a CSE that is that target of a Request operation. For example the CSE where an Originator is trying to perform a resource discovery.

Registree CSE Registree CSE is a CSE that registers to a second CSE to receive the services offered by the second CSE.

Registrar CSE Registrar CSE is a CSE that accepts registration requests from a Registree CSE or AE, and offers services to the Registree CSE or AE.

Remote CSE Remote CSE is a CSE that is not a Hosting CSE of a resource.

Transit CSE Transit CSE is a CSE which is not the destination of a service layer message, but rather an intermediary CSE for forwarding or relaying the service layer message towards the Receiver CSE.

Transit Node Transit node is a M2M service node which is not the destination of a service layer message, but rather an intermediary node for forwarding or relaying the service layer message towards the destination.

Unless otherwise specified, the following abbreviations are used herein.

ADN Application Dedicated Node
AE Application Entity
API Application Programming Interface
App Application
ASM Application and Service Layer Management
ASN Application Service Node
CMDH Communication Management and Delivery Handling
CSE Common Service Entity
CSF Common Service Function
DIS Discovery
DMR Data Management and Repository
IN Infrastructure Node
IoT Internet of Things
IP Internet Protocol
LOC Location
M2M Machine-to-Machine
MN Middle Node
MOB Mobility
NSE Underlying Network Services Entity
NSSE Network Service Exposure, Service Execution and Triggering
REG Registration
ROA Resource Oriented Architecture
SC Service Capability
SCA Service Charging and Accounting
SEC Security
SOA Service Oriented Architecture
SUB Subscription and Notification
UDP User Datagram Protocol
URI Uniform Resource Identifier The below description illustrates two example use cases where mobile M2M applications make use of the services provided by a service layer. It is assumed that these applications obtain M2M services from a local service layer, as well as potentially, a number of remote service layers.

Figure 11:
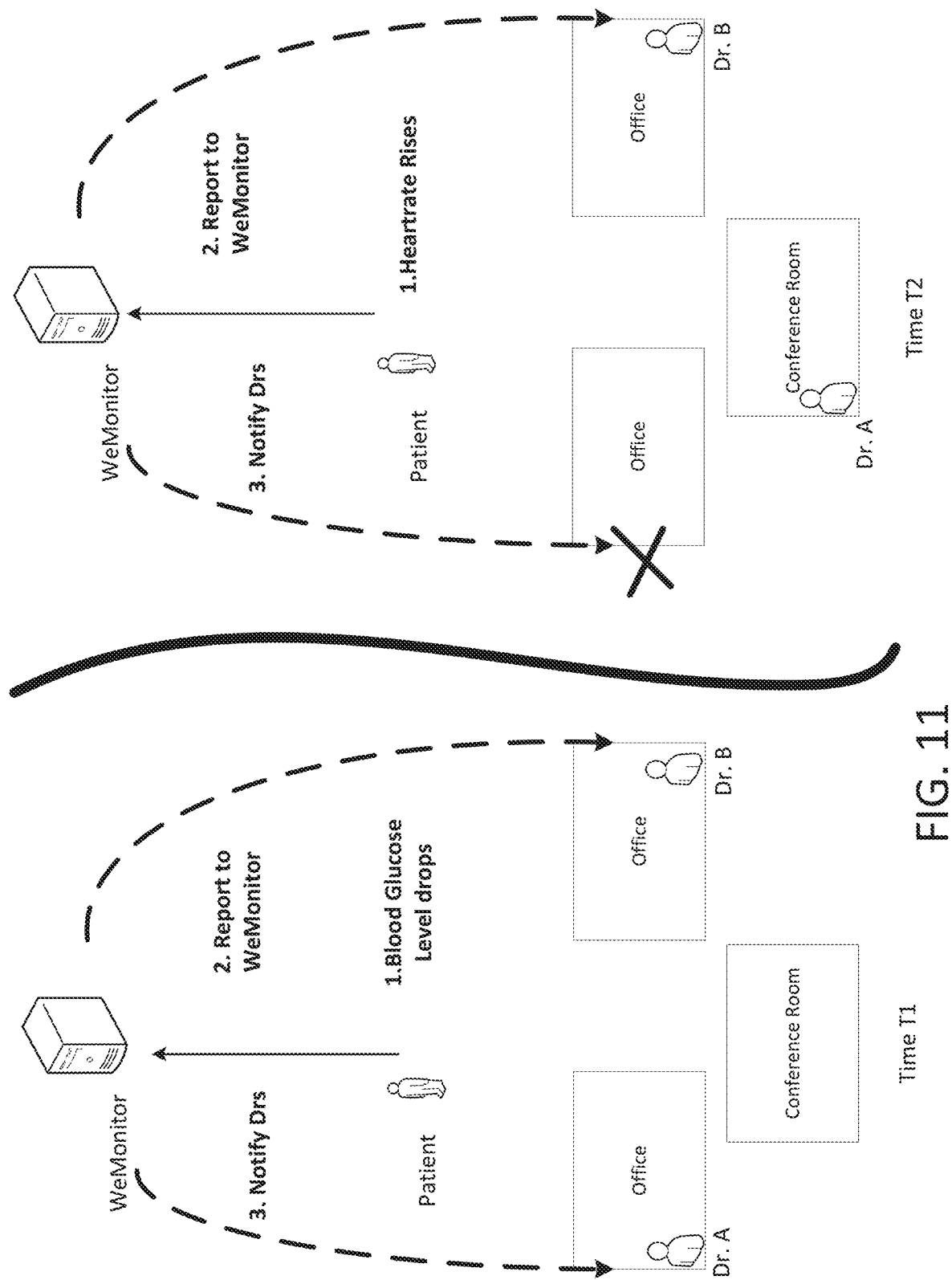
FIG. 11 is a diagram that illustrates a Health Monitoring with Alerts.

The first example use case concerns remote health monitoring, and is shown in FIG. 11. In the use case shown in FIG. 11, two doctors (Dr. A and Dr. B) in a senior care facility are worried about the blood glucose level of a patient (Patient A). The information is collected by the patient's body sensor and stored in local gateways. In addition, the information is also sent to WeMonitor, a health monitoring company which provides alerts based on configured thresholds, etc. To view patient status, the doctor's both use tablets with a suite of installed M2M health applications. As they move in the senior care facility, their tablets connect to different gateways.

Both doctors have requested WeMonitor notify them, if either

PatientA's blood glucose level falls below 40 mg/dl or
IfPatientA's heartrate rises significantly.

As WeMonitor does not keep track of each doctor's location within the senior care facility, they have both requested that they be notified only through their home office gateway. This is in line with how oneM2M service layer sends notification to an AE based on the AE's registrar CSE. At time t1, PatientA's blood glucose level falls below the threshold. As both Drs. are in their office, they are able to receive the alarm/notification. Fortunately, they both visit the patient and prescribe the needed medication—all is fine. Later that day (at time t2), the patient's heartrate begins to rise. Dr. B is still in his office, but Dr. A is in the conference room attending a meeting. As Dr. B is not on his office gateway, he will not receive the notification.

The second example use case concerns a group firmware upgrade. A company has bought a number of off-the shelf sensors and would like to install them in an industrial factory. Once installed, but before use, the company would like to do a firmware upgrade to guarantee that all devices are running the same software version. These devices have limited communication range and will communicate with the nearest gateway. Each of these gateways provides M2M services to the sensors. At first boot-up, the devices connect to the nearest gateway and register. They are now ready to use the M2M services. The company would like to take advantage of the group capability of the service layer to make the upgrade more efficient. As the company knows where each sensor has registered, it creates a group that includes all the sensors, and then sends the firmware upgrade. The service layer group functionality is then responsible for delivering the firmware upgrade to the individual devices.

Figure 12:
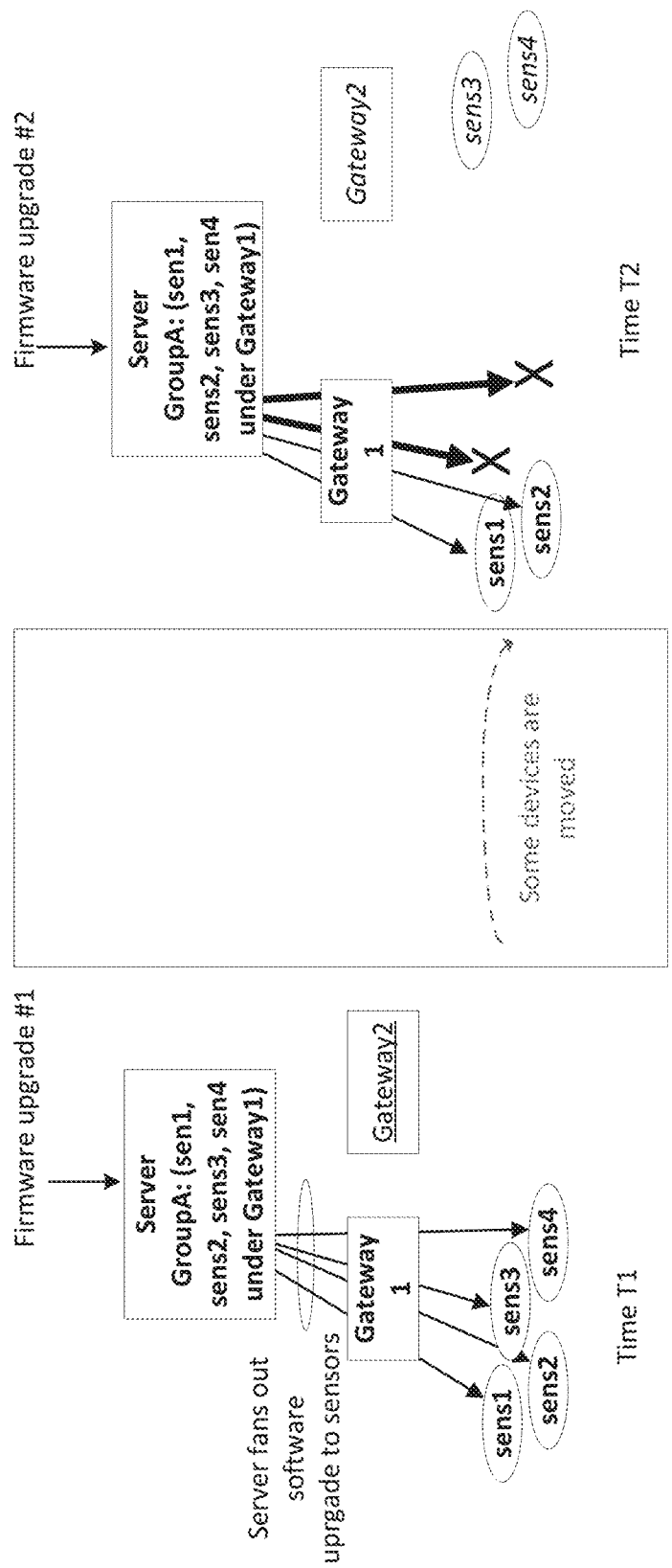
FIG. 12 is a diagram that illustrates a Group Firmware Upgrade.

A few months later, a new patch is available, and the company would like to push this to all its sensors. In the interim, some of the sensors have been moved and have connected to different gateways. For example, FIG. 12 shows a case where 2 devices (sens3 and sens4) are no longer connected to Gateway1 but are now connected to Gateway2. In this case, if we use the same group to send the firmware upgrade #2, 2 devices will not be upgraded.

Both use cases above show typical use cases which involve an interaction targeting an M2M application. This is expected to be a very common occurrence in the M2M space. However, the use of a service layer (especially oneM2M) results in some issues with the above use cases. One of the principles in developing a service layer is to alleviate some of the burden on the applications. The intention is for these applications to have an API that will allow them to request services from the service layer. As a result, applications typically register to service layers in order to use the M2M services they provide.

Unfortunately, this process leads to a number of issues because:
1) Applications must register to a service layer to obtain the M2M services,
2) As applications move they may have to re-register to different service layers (for instance due to proximity);
3) Applications are contacted through their point of registration; and
4) Some services need to have a way to contact the applications.

For oneM2M in particular, when an application registers to a CSE, it creates an <AE> resource on that CSE. The <AE> resource, or any of its child resources, is referenced via a URI that uniquely identifies this resource. This URI may be hierarchical or non-hierarchical (using resourceIDs). This URI may be present as an attribute of a resource hosted on a remote CSE, and this allows the remote CSE to provide services to the <AE>. In non-limiting example, the following services may be provided:
  Announce Service: has a "link" attribute that points back to the original <AE> resource.
  Group Service: When fanning out a message to a group, some of these group members may be related to AEs. For instance the group members may be resourceIDs of <AE> resources or child resources of an <AE> resource.
  Subscribe/Notify service: As part of subscribe/notify, a subscriber may specify an <AE> resource as a notification target.
  Polling Service and Re-targeting: rely on an AE's point of registration.

As mentioned in the background section, the M2M services may be distributed in service layers within various entities (middle nodes, gateways, devices servers, etc.). Within these service layers, some M2M services will have contact information that will refer to applications. If an application changes its point of registration, then its contact information changes, and as a result the contact information stored in the service layers is invalid. In oneM2M for example, when an AE 'moves' and registers to another CSE (in the same or different SP domain), services that reference either the <AE> resource (or one of its child resources) hosted on the original registrar CSE will now have stale URI information (since the CSE-ID and possibly SP-ID used in the URI may have changed). This results in inefficient and sometimes failed M2M services.

Figure 13:
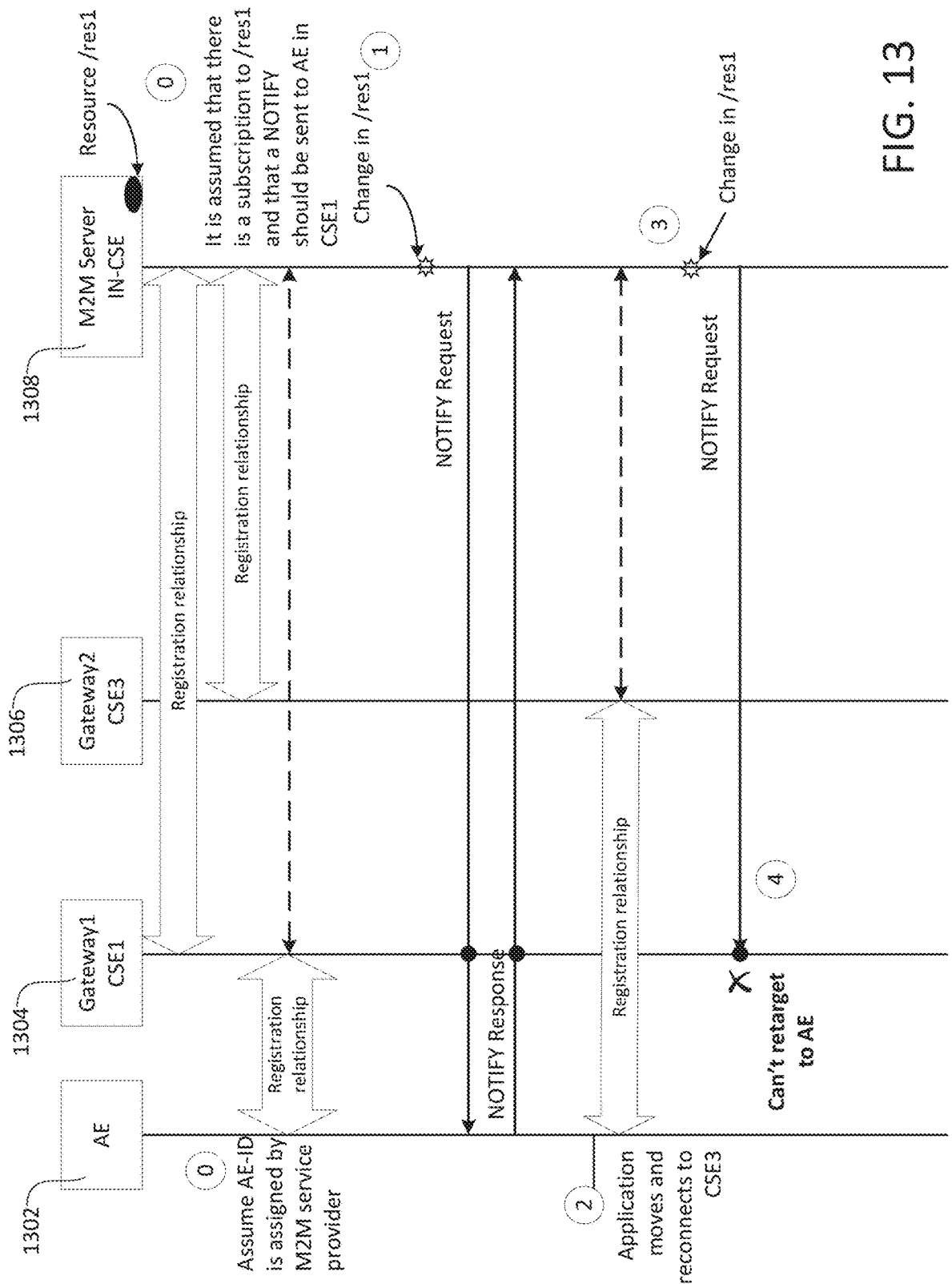
FIG. 13 is a diagram that illustrates a Notification Target to a moving AE.

FIG. 13 shows the problem for a Subscribe/Notify service in oneM2M. It is assumed that AE 1302 has already registered to CSE1. Furthermore it is assumed that there is a remote subscription to resource /res1, hosted on the IN-CSE. The <AE> child resource on CSE1, is included as one of the notification targets of the subscription. At time 1, there is a change in /res1. The subscription service of IN-CSE will generate a notification, and send it to AE through CSE1. At time 2, AE loses connection to CSE1 1304 and connects to CSE3 1306. It registers with CSE3 1306 and now can only be reached through CSE3 1306. It is also assumed that the AE changes its network address as a result of connecting to CSE3 1306. At time 3, there is another change in /res1. The IN-CSE attempts to send the notification to AE through CSE1 (time 4), but now this notification cannot be retargeted to AE 1302. So in summary, if an AE registers to CSE, then:
  The old <AE> resource in CSE1 1304 cannot move,
  If AE moves, it will create a new <AE> resource on CSE3 1306,
  However, notifications are always associated with the old <AE> resource.

Two solutions are described below to the problems resulting from the application mobility, among others. The first solution may apply to cases where the applications announce themselves to the M2M server, and it is the M2M server that provides a unique identifier (AE-ID) to the application entities upon registration. This AE-ID is unique within the service provider domain. The second solution applies to the case where the M2M server may not even be aware of the application, and a local service layer (for example at a gateway) provides the identifier (AE-ID) to the application. This AE-ID is only unique within the local service layer. It may not necessarily be unique within the service provider domain. In both cases, the main idea is to have the M2M server determine that an AE mobility event has occurred and then take proactive actions.

In the following, the term 'AE mobility event' is used to denote any event where an application changes its registration point from one service layer to another or the registration point's transport layer address changes (i.e., an IP address change). This can occur, for example, due to:
  Mobility: application moves and registers to a new CSE (service layer entity);
  Radio Interference: application loses connectivity to one service layer and finds an alternate service layer; and/or
  Profile/Policy Based: application changes service layer based on some policy. For example:
    time of day,
    underlying network connectivity (for instance entity may choose WiFi over cellular if both are available), and/or available power (choose a service layer that results in using less transmission power).

It is assumed that an application may choose whether or not it wants the service layers to take proactive actions when it undergoes an AE mobility event. In some cases, the application may just want services from a local service layer. As a result, the application is not interested if services in remote service layers are inefficient or fail as a result of the AE mobility event. The application may include an indicator in its registration message to the service layer, to specify if it wants the service layer to react to AE mobility events. For example, the application may include a localRegistration parameter in its registration request. If set to TRUE, the application is requesting that the service layer not take proactive actions in case of a detected AE mobility event. If set to FALSE or NULL, the application is requesting that the service layer assist it when it undergoes an AE mobility event. Alternatively, the application may include another flag that has a similar role to localRegistration. For example, a trackRegistrationPoints parameter. If set to FALSE, the application is requesting that the service layer not take proactive actions in case of a detected AE mobility event. If set to TRUE or NULL, the application is requesting that the service layer assist it when it undergoes an AE mobility event Furthermore, we use the term 'AE contact information' to refer to the URI of an <AE> resource (or one of its child resources). The AE contact information may be a hierarchical URI or a non-hierarchical URI (using resource IDs). In oneM2M, the AE contact information is tied to the service layer at which the application is registered, through the <AE> resource created during application registration. If an AE re-registers to a new service layer, its AE contact information may change. A service layer may have AE contact information in, for example:

1) announce link attributes that point back to the <AE> resource or any of the <AE> child resources;
2) stored lists of notification targets (either due to some subscription or some non-blocking asynchronous request) that point back to the <AE> resource; and/or
3) group memberships (stored in memberIDs list), that include the <AE> resource (or one of its child resources) as a group member.

It should be appreciated that the solutions described herein are written from the perspective of AE mobility. However the same solutions may be applied for SL mobility, as the node hosting an SL moves and the SL registers with different service layers.

Figure 14:
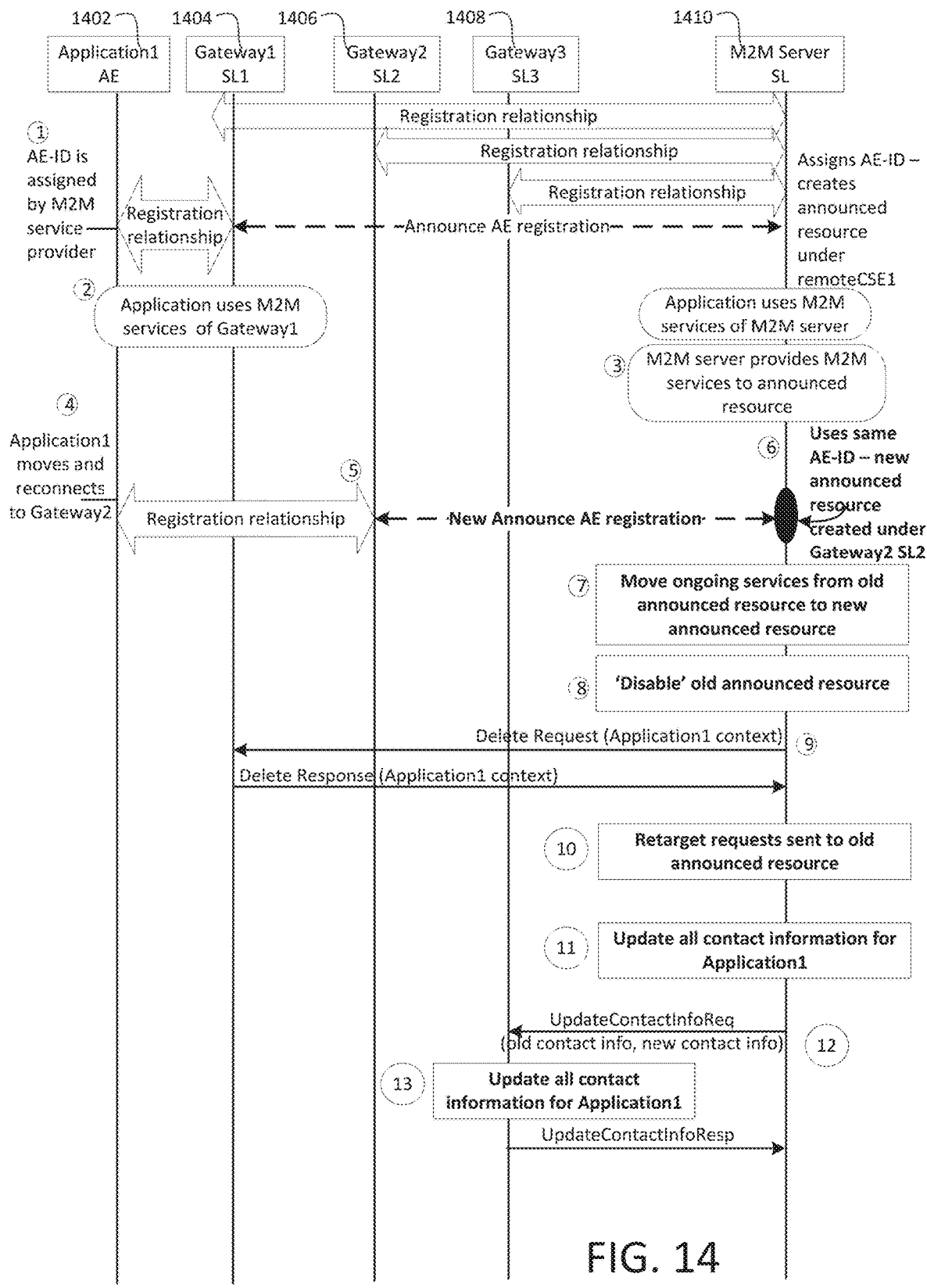
FIG. 14 is a diagram that illustrates Case 1 where a Service Provider Assigns AE-ID.

In a first example embodiment, Case 1, an M2M server may be aware of AE registration. The overall flow is shown in FIG. 14. The highlighted steps are numbered and described below. Note that it is assumed that there are 3 local service layers (SL1 1404 in Gateway1, SL2 1406 in Gateway2 and SL3 1408 in Gateway3) and that these have already registered with the M2M server.

In Step 1 of FIG. 14, Application1 1402 connects and registers to local service layer at Gateway1 1404, and as part of this initial registration, application1 1404 asks to have its presence announced at the M2M server 1410, and to have its identifier (AE-ID) assigned by the M2M server 1410. The M2M server 1410 creates the announcement for the application 1402 and assigns a service provider unique AE-ID. In oneM2M, the announcement is achieved by creating an announced resource at the M2M server 1410, and the AE-ID has a prefix 'S' to signal that it is provided by the M2M server 1410.

In Step 2 of FIG. 14, Application1 1402 begins to use a number of active/ongoing M2M services. For example:

Application1 1402 may be using the service layers in the M2M server 1410 and/or M2M gateways 1404, 1406, and 1408 to announce its presence. The announcement will contain a link back to Application1 1402. For instance in oneM2M, this is more specifically a link back to the application resource (<AE>) hosted by service layer at Gateway1 1404.

Application1 1402 may be using the subscription/notification service of a service layer (at M2M server 1410 and/or another M2M gateway). For instance, Application1 1402 may be notified when some service layer resource in the service provider domain, but hosted on a different Gateway than its own or on the M2M Server, changes.

Application1 1402 may be using a remote group service of a service layer (at M2M server and/or another M2M gateway). A remote group may include Application1 1402 as one of its members. As a result, the service layer hosting the service, would fan-out the request to Application1 1402.

In Step 3 of FIG. 14, the M2M server 1410 may also provide M2M services on the announcements of Application1 1402 including for example, data storage, semantic discovery, fan-out functionality, access control, and subscribe/notify service.

In Step 4 of FIG. 14, Application1 1402 moves and loses connectivity to Gateway1 1404 and finds Gateway2 1406.

In Step 5 of FIG. 14, Application1 1402 starts a re-registration procedure with the Gateway2 service layer. As part of re-registration, the application 1402 supplies its service provider unique AE-ID (in oneM2M with prefix 'S') and again asks that its presence be announced at the M2M server 1410. Gateway2 1406 observes that this is a) a re-registration request since the AE-ID has been provided by the service provider from a prior registration and b) a request from an unknown application. These two conditions allow Gateway2 1406 to determine that the request may be a consequence of a mobility event. As a result it creates a new announcement for the application at the M2M server 1410.

Note that in cases where the AE-ID is pre-provisioned in the application 1402, then the application 1402 may supply another indicator to the service layer to indicate if this is an initial registration or a re-registration. For example, the application 1402 may include an initialRegistration indication in the registration request (set to TRUE if this is an initial registration with a pre-provisioned AE-ID, and set to FALSE or NULL if not an initial registration). Alternatively, another marker may be used in the AE-ID to signal a pre-provisioned AE-ID (say be starting the AE-ID with a 'P' prefix). In another alternative, the registration message may include a new field to indicate the CSE-ID of any prior registration. For example, in a priorRegistrarCSEID field. Upon reception of the registration message, the receiving CSE may compare the received priorRegistrarCSEID field with its own CSE-ID. If they match, the CSE infers that the application is re-registering to the same CSE. If they differ, the receiving CSE infers that the application is re-registering to a new CSE. If priorRegistrarCSEID is NULL, the receiving CSE infers that this is an initial registration.

In Step 6 of FIG. 14, M2M server 1410 examines the new application announcement to check if it is using a previously allocated AE-ID (from Step 1) and determines that the application 1402 is re-registering (as application 1402 is supplying an M2M server provided AE-ID) at a new service layer (as the request is trying to create a new announcement rather than updating the previous announcement). M2M server 1410 creates the new announcement.

In Step 7 of FIG. 14, M2M server 1410 moves any active/ongoing services tied to the SL1 registration announcement to the SL2 registration announcement. This implies that any services the M2M server 1410 provides to the SL1 registration announcement should be transferred to the SL2 registration announcement. This includes, for example, services related to data storage, subscription/notification, group management, access control management, and semantic discovery. The transfer involves suspending ongoing services related to SL1 registration announcement, copying any related resources from SL1 registration announcement to the SL2 registration announcement, and resuming the ongoing services related to the SL2 registration announcement. In particular, M2M server copies various child resources stored under announced AE resource (hosted on M2M server 1410) from SL1 1404 to announced AE resource from SL2 1406 (also hosted on M2M Server 1410). For example in oneM2M, the announced AE resource <AEAnnc> may include the following child resources: <subscription>, <semanticDescriptor>. <container>, <flexContainer>, <group>, and <accessControlPolicy>. These resources may be copied to announced AE resource from SL2 1406.

Alternatively, the M2M server 1410 may maintain both registration announcements and have a new link attribute pointing from the SL1 announcement to the SL2 announcement. When the M2M server 1410 detects the mobility event, it may update the new link attribute in the SL1 announcement so that it points to the SL2 announcement. Then any time the M2M server 1410 receives a reference to SL1 announcement, it can get the SL1 link that points to SL2 announcement.

In Step 8 of FIG. 14, 'Disable' the SL1 registration announcement. This can be done in a number of ways. For example, the SL1 registration announcement may be deleted. Alternatively, the SL1 announcement may be suspended, and this announcement will eventually expire. Alternatively, the M2M server 1410 may keep old registration announcements, but always use the latest registration announcement (based on last modified time or creation time) for any interaction with the application 1402.

In Step 9 of FIG. 14, as the application 1402 is no longer registered to SL1 1404, the M2M server 1410 may proactively delete any application related context from SL1 1404—for example through a DELETE /CSE1/S_AE1. The M2M server 1410 may provide a reason for the deletion in a new requestCause parameter. In this call flow, the requestCause could be set to "UE mobility event".

Alternatively. M2M server 1410 may disable or suspend <AE> resource in SL 1404. Effectively this will suspend any services tied to the <AE> resource but will allow SL1 1404 to keep the context related to this resource. Consequently, if/when AE moves again and re-registers to SL1 1404, SL1 1404 will have awareness of this AE 1402. This may enable SL1 1404 to more efficiently handle mobile AEs. For example, it may maintain security credentials for AE 1402, such that SL1 1404 can reduce the overhead of having to get this information from M2M Server 1410. This could be useful for cases where AE 1402 moves between CSEs in a periodic and/or repeated basis.

In Step 10 of FIG. 14, the M2M server 1410 may receive incoming requests that target the old registration announcement (or one of its related child resources). In this case, the M2M server 1410 may retarget any requests sent to SL registration announcement. Any time the M2M server 1410 receives a request for the SL1 registration announcement resource or one of its child resources, the M2M server 1410 will retarget these to the SL2 registration announcement resource. As part of this retargeting, the M2M server 1410 may modify request parameters (for instance change the destination/to field parameter to the SL2 registration announcement).

In Step 11 of FIG. 14, M2M server 1410 updates any locally maintained contact information for the application 1402. The M2M server 1410 will go through the contact information in all the notification targets, all announcement links, and all group member IDs it locally maintains, and will update any contact information pointing to SL1 1404. In particular, M2M server 1410 updates any URIs referring to <AE> resource by replacing CSE-ID of SL1 1404 with CSE-ID of SL2 1406, and if necessary by replacing SP-ID of SL1 1404 with SP-ID of SL2 1406.

In Step 12 of FIG. 14, M2M server 1410 propagates the change in AE contact information to the child service layers and potentially other M2M servers in on other service provider domains. If the M2M server 1410 knows the service layers that are impacted by the application mobility, it can contact these individually. Alternatively, the M2M server 1410 may fan-out a request to all service layers, informing them to update the contact information for the application 1402. This can be implemented through an UpdateContactInfoReq/UpdateContactInfoResp message exchange. The request message may include a reason for the update, in a requestCause parameter. Further options are described below.

In Step 13 of FIG. 14, the service layers receiving these requests will go through the contact information in all the notification targets, all announcement links, and all group member IDs, and will update any contact information pointing to the corresponding AE's resource hosted on SL1 1404, to reflect the new SL (i.e. SL2 1406) it is now registered to.

Figure 23A:
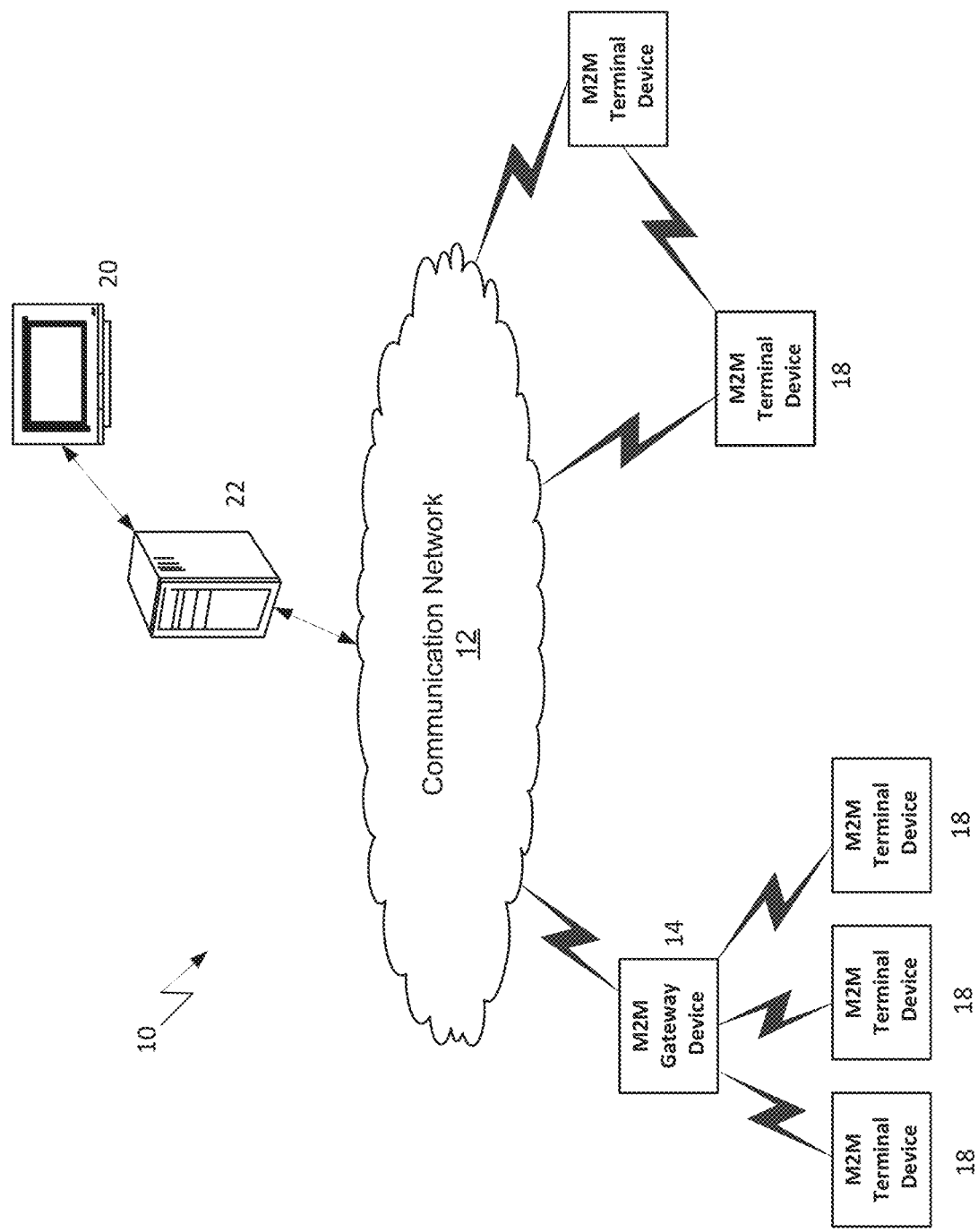
FIG. 23A is a system diagram of an example machine-to-machine (M2M), Internet of Things (IoT), or Web of Things (WoT) communication system in which one or more disclosed embodiments may be implemented.
Figure 23B:
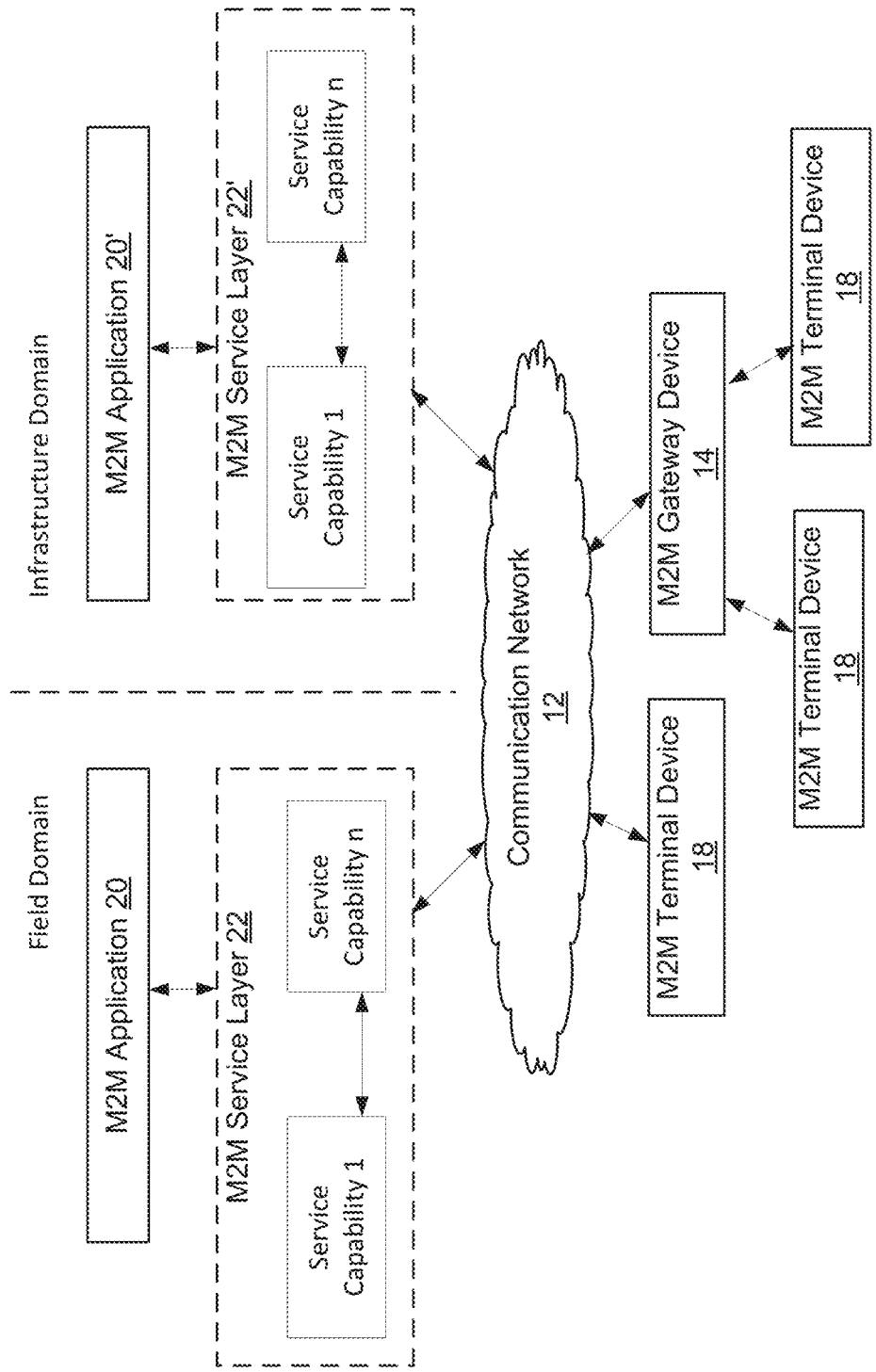
FIG. 23B is a system diagram of an example architecture that may be used within the M2M/IoT/WoT communications system illustrated in FIG. 23A.
Figure 23C:
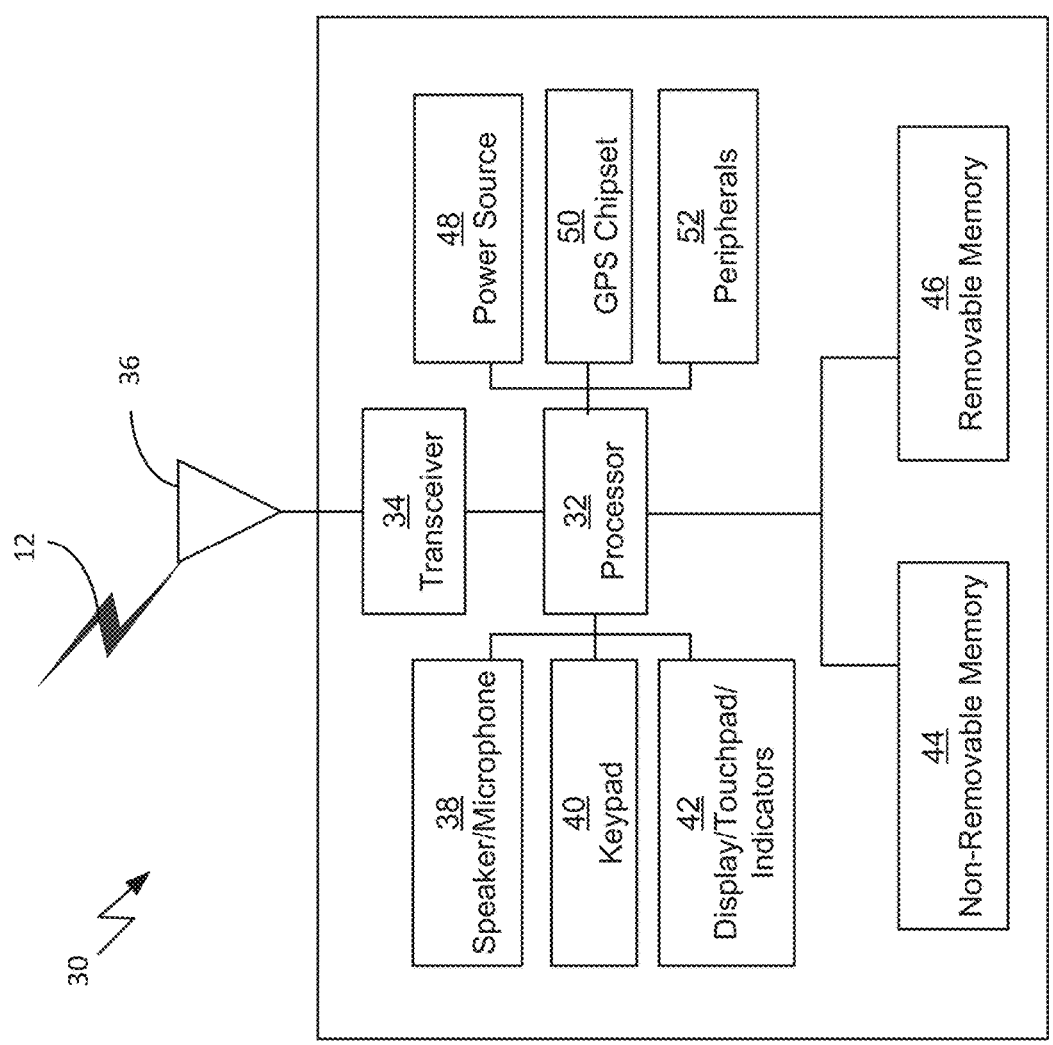
FIG. 23C is a system diagram of an example communication network node, such as an M2M/IoT/WoT device, gateway, or server that may be used within the communications system illustrated in FIGS. 23A and 23B.
Figure 23D:
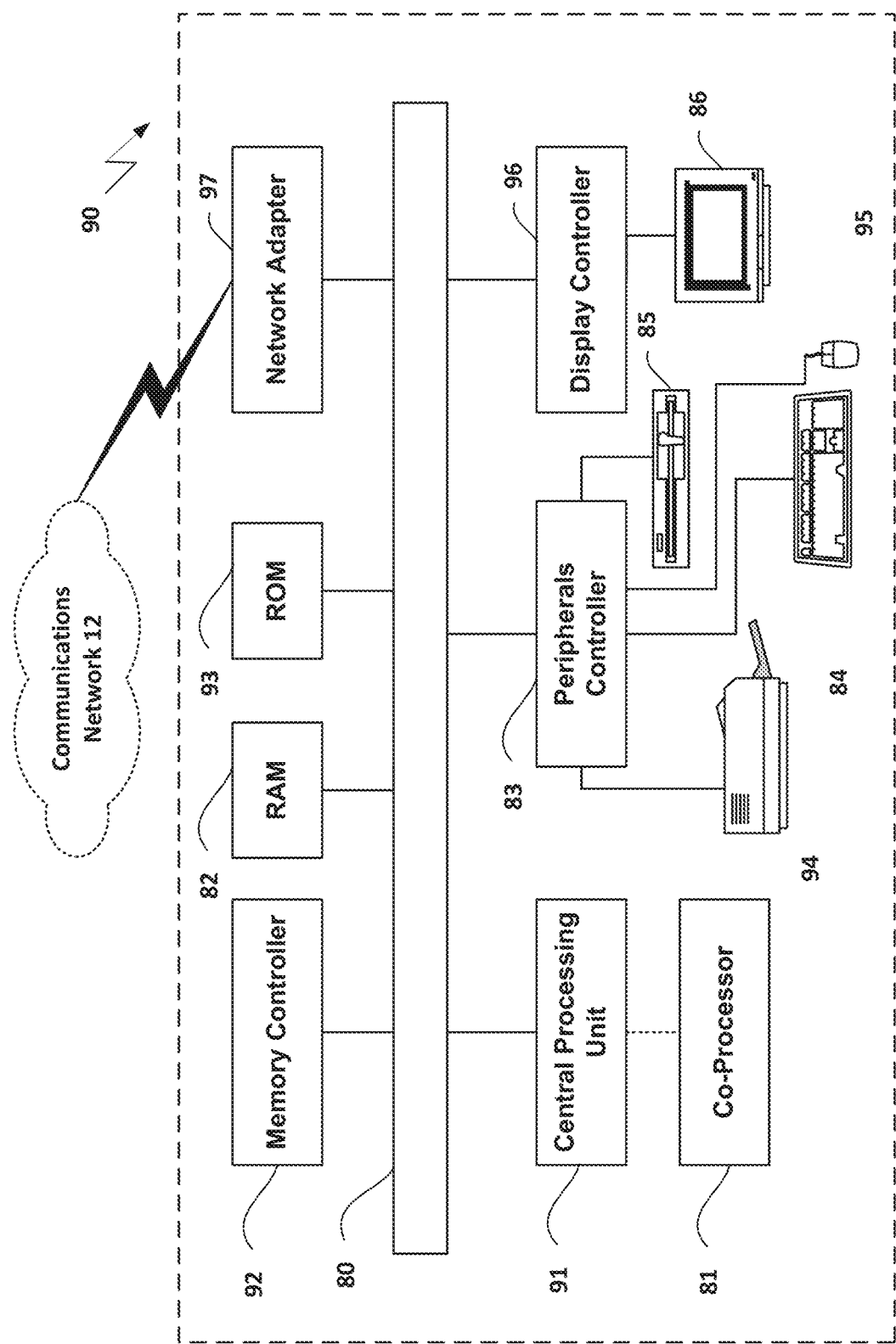
FIG. 23D is a block diagram of an example computing system in which a node of the communication system of FIGS. 23A and 23B may be embodied.

It should be appreciated that the entities performing the steps illustrated in FIG. 14 may be logical entities that may be implemented in the form of software (i.e., computer-executable instructions) stored in a memory of, and executing on a processor of, an apparatus configured for wireless and/or network communications or a computer system such as those illustrated in FIG. 23C or FIG. 23D. That is, the method(s) illustrated in FIG. 14 may be implemented in the form of software (i.e., computer-executable instructions) stored in a memory of an apparatus, such as the apparatus or computer system illustrated in FIG. 23C or FIG. 23D, which computer executable instructions, when executed by a processor of the apparatus, perform the steps illustrated in FIG. 14. It should also be appreciated that the functionality illustrated in FIG. 14 may implemented as a set of virtualized network functions. The network functions may not necessarily communicate directly, rather, they may communicate via forwarding or routing function. It should further be appreciated that any transmitting and receiving steps illustrated in FIG. 14 may be performed by communication circuitry of the apparatus under control of the processor of the apparatus and the computer-executable instructions (e.g., software) that it executes.

In a second example embodiment, Case 2, an M2M server may be unaware of AE registration. Case 1 focused on solutions where the M2M server 1410 provides the application identity (AE-ID) to the application 1402. This provides the M2M server 1410 some insight into when an application 1402 has moved. However there are some applications that may not want to be announced to the M2M server 1410 or may not want to communicate with remote service layers. In such cases, the application identity (AE-ID) is typically provided by the local service layer and is only guaranteed to be unique within that local service layer. This section describes solutions to handle the AE mobility event for such applications.

Figure 15:
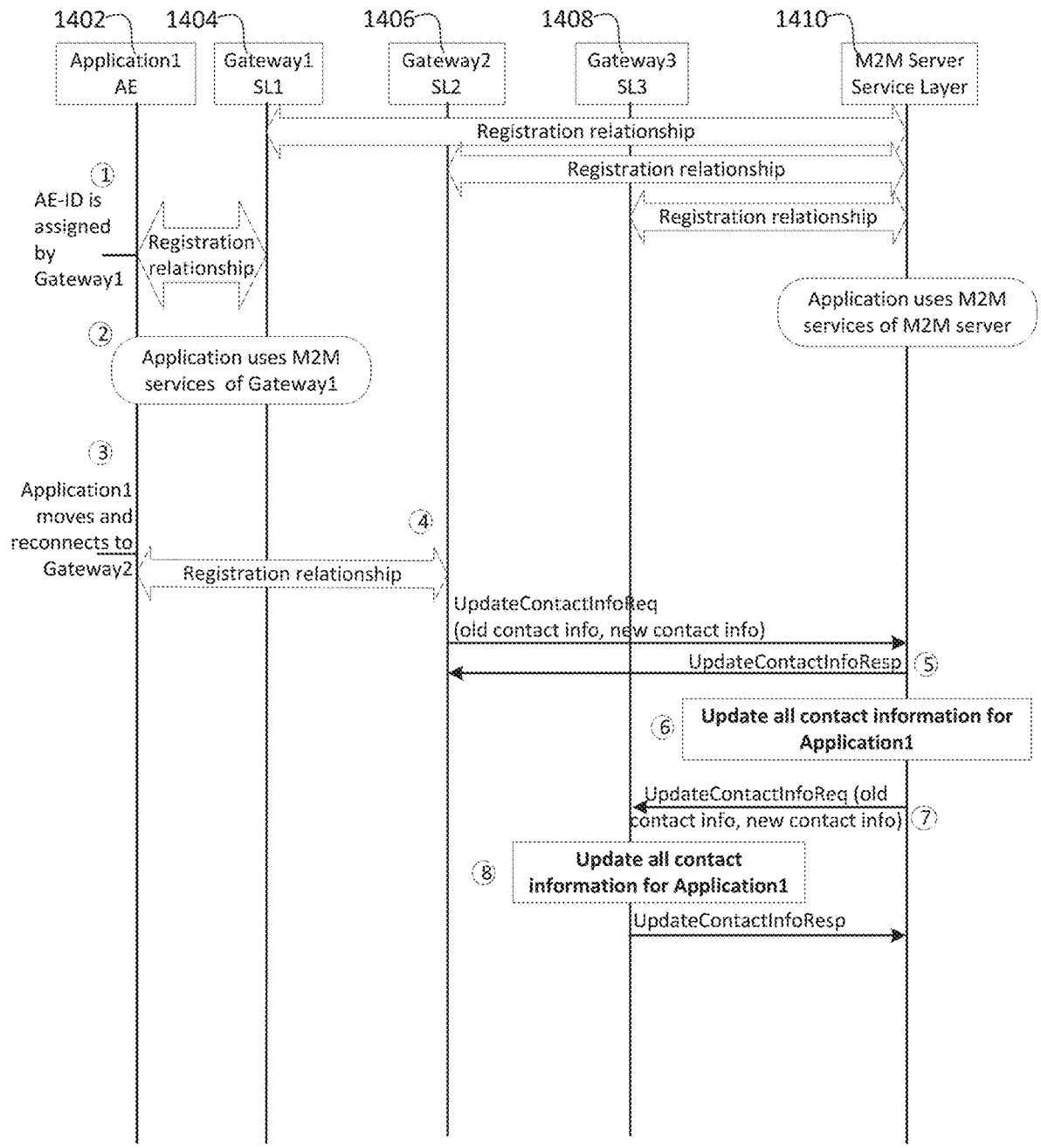
FIG. 15 is a diagram that illustrates Case 2 where Local Service Layer Assigns AE-ID.

The overall flow is shown in FIG. 15. The highlighted steps are numbered and described below. Note that it is assumed that there are 3 local service layers (SL1 1404 in Gateway1, SL2 1406 in Gateway2, and SL3 1408 in Gateway3) and that these have already registered with the M2M server 1410. Note that the last assumption (SL1 1404 and SL2 1406 individually registered to the service layer in the M2M server 1410) is not a requirement for the solution. In fact, the described method applies to any case that SL1 1404 and SL2 1406 have a communication path to the M2M server 1410.

In Step 1 of FIG. 15, Application1 1402 connects and registers to local service layer at Gateway1 1404, and as part of this initial registration, the application 1402 asks to have its identifier (AE-ID) assigned by the local service layer. The local service layer in Gateway1 assigns a locally unique AE-ID. In oneM2M such identifiers start with the character 'C'.

In Step 2 of FIG. 15, Application1 1402 begins to use a number of active/ongoing M2M services supported by the local SL1 1404 (as described in Step 2 in FIG. 14).

In Step 3 of FIG. 15, the AE moves and loses connectivity to Gateway1 1404, and finds Gateway2 1406.

In Step 4 of FIG. 15, Application 1402 starts a re-registration procedure with the Gateway2 service layer. As part of re-registration, the application 1402 supplies its AE-ID. Gateway2 1406 observes that this is a re-registration request (since the AE supplies an AE-ID) from an unknown application, and as a result determines that the request may be a result of an AE mobility event. Based on the format and/or value of the supplied AE-ID, Gateway2 1406 knows that the AE-ID was assigned by another service layer. Alternatively, the application 1402 may supply the Gateway2 service layer, an identifier of the service layer that it was already connected to (Gateway1 service layer for this example). This would allow Gateway2 service layer to immediately determine that this is an AE mobility event. If the AE-ID is currently available in Gateway2 1406, the service layer maintains the AE-ID, completes the registration, and responds with an indication that the AE-ID was not recognized and that the Gateway is different than the Gateway that the AE 1402 was previously registered to. If the AE-ID is already being used by another application registered to Gateway2 1406, then the service layer will assign a new locally unique AE-ID and provide an indication that the Gateway is different than the Gateway that the AE 1402 was previously registered to.

Note that in cases where the AE-ID is pre-provisioned in the application 1402, then the application 1402 may supply another indication to the service layer to indicate if this is an initial registration or a re-registration. For example, the application 1402 may include an initialRegistration indication in the registration request (set to TRUE if this is an initial registration with a pre-provisioned AE-ID, and set to FALSE or NULL if not an initial registration). Alternatively, another marker may be used in the AE-ID to signal a pre-provisioned AE-ID (say be starting the AE-ID with a 'P' prefix).

In Step 5 of FIG. 15, Gateway2 notifies the M2M server 1410 about a potential change in contact information for the application 1402, by sending an UpdateContactInfoReq message. This message includes the old and new contact information for the application 1402. Included in this message should be the CSE-ID and SP-ID of Gateway2 to inform the M2M Server that this AE is now registered to Gateway 2.

In Step 6 of FIG. 15, M2M server 1410 updates the contact information for the AE 1402. This may include, in non-limiting example:

any notification targets that include the URI of the of the old contact information. In oneM2M, these may be part of <subscription> resources included in the M2M server or as part of pending responses to nonblocking Asynchronous requests, any announcement links that include the URI of the of the old contact information. In oneM2M this may include the link attributes of any <AE> resources that have been announced to the M2M server, and/or any group memberships that include the URI of the old contact information. In oneM2M this may include any memberIDs attributes of <group> resources.

In Step 7 of FIG. 15, M2M server 1410 propagates the change in contact information to the child service layers and potentially other M2M servers in on other service provider domains. If the M2M server knows the child service layers that are impacted by the application mobility, it can contact these individually. Alternatively, the M2M server 1410 may fan-out a request to all service layers, informing them to update the contact information for the application 1402. This can be implemented through an UpdateContactInfoReq/UpdateContactInfoResp message exchange.

In Step 8 of FIG. 15, the service layers will update the contact information in the notification targets, any announcement links, and any group memberships. The original service layer (SL1 1404) may delete or suspend the context related to the application 1402. If suspended, the SL1 1404 will not delete the resource, but will suspend any service layer processing tied to this resource. This would allow for a simpler re-registration if the application 1402 tries to re-register with the service layer at a later time.

It should be appreciated that the entities performing the steps illustrated in FIG. 15 may be logical entities that may be implemented in the form of software (i.e., computer-executable instructions) stored in a memory of, and executing on a processor of, an apparatus configured for wireless and/or network communications or a computer system such as those illustrated in FIG. 23C or FIG. 23D. That is, the method(s) illustrated in FIG. 15 may be implemented in the form of software (i.e., computer-executable instructions) stored in a memory of an apparatus, such as the apparatus or computer system illustrated in FIG. 23C or FIG. 23D, which computer executable instructions, when executed by a processor of the apparatus, perform the steps illustrated in FIG. 15. It should also be appreciated that the functionality illustrated in FIG. 15 may implemented as a set of virtualized network functions. The network functions may not necessarily communicate directly, rather, they may communicate via forwarding or routing function. It should further be appreciated that any transmitting and receiving steps illustrated in FIG. 15 may be performed by communication circuitry of the apparatus under control of the processor of the apparatus and the computer-executable instructions (e.g., software) that it executes.

As described above, once the M2M server 1410 is aware that there has been an AE mobility event, it needs to update the AE contact information locally (within the M2M server 1410) and in all child service layers within the same service provider domain, as well as potentially in other service provider domains. In one solution, the M2M server 1410 may create a group including all these other service layers, and then fan out the UpdateContactInfoReq to all service layers. However, this may result in a significant signaling overhead to inform the service layers about the new AE contact information. In order to improve the efficiency and/or security, at least one of the following methods may be used, each of which is described in greater detail below:

1) M2M server 1410 may discover the impacted service layers and fan out message only to those service layers;
2) M2M server 1410 may maintain a list of SLs that are impacted by AE contact information changes. When needed, M2M server 1410 may query this list and send an UpdateContactInfoReg only to the impacted SLs; and
3) Have the child service layers create a subscription at the M2M server 1410 that will send out notifications when there is an AE mobility event.

An M2M server may discover impacted service layers and fan out messages only to those service layers. The main idea is to have the M2M server 1410 discover all the service layers that are maintaining stale AE contact information (for instance through announce links, group member ID, or notification targets). Once found, the M2M server 1410 can target UpdateContactInfoReq only to those service layers. It can create a group including the discovered service layers and subsequently fan out the UpdateContactInfoReq message.

The M2M server 1410 may do this periodically, allowing it to build a complete list of AE contact information used in each service layer. Alternatively M2M server 1410 may do this on demand, when it needs to find the service layers that are effected by a particular AE mobility event. The latter procedure is described below. It is assumed that the AE1 (with resource name: thermoControl and resource ID: TC001) is originally registered with service layer1 (with CSE-ID CSE001) and after the mobility event, the AE1 is registered with service layer2 (with CSE-ID CSE002).

Figure 16:
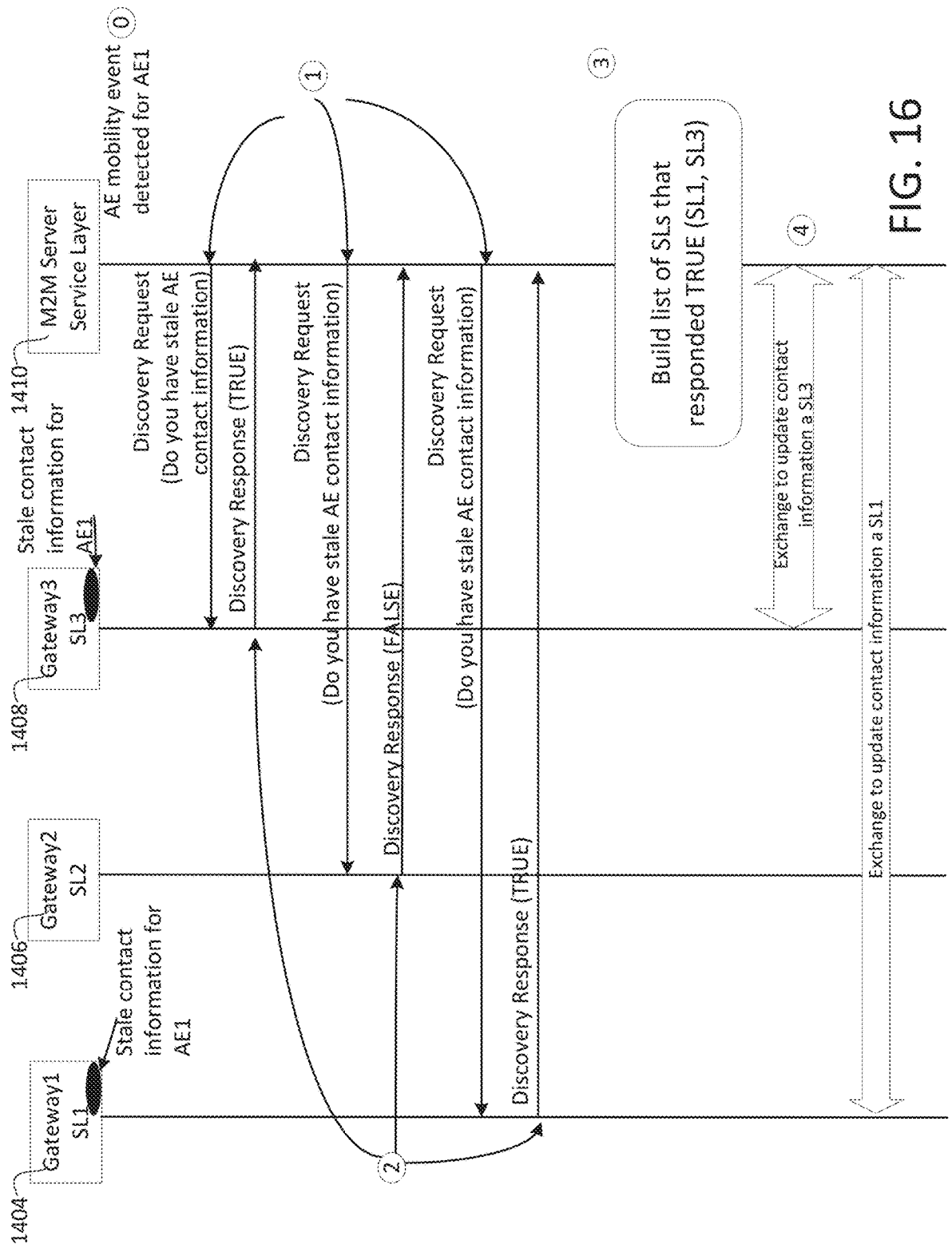
FIG. 16 is a diagram that illustrates Discover Impacted Service Layers.

An example procedure is shown in FIG. 16, and described in the steps below.

In Step 1 of FIG. 16, when the M2M server 1410 detects an AE mobility event for AE1, it issues an enhanced discovery request to each child service layer. The discovery request asks the service layer to look for the stale AE contact information (as described earlier this may include information related to announce links, group member IDs, or notification targets). The discovery query may use wildcard characters (*) to assist the search of AE contact information related to AE1. For example, the search can be for any matches to the resource name of AE1 (e.g. /CSE001/*/thermoControl/*). Alternatively the search can be for any matches to the resource ID of AE1 (e.g. /CSE001/*/TC001/*). The request may include a list of AE contact information. Optionally, the request may also specify the root of the search—so that the child service layers begin their search at this root.

In Step 2 of FIG. 16, each child service layer responds to the discovery request with a Boolean result: TRUE if the service layer has a matching content, or FALSE if the service layer has no matching content. The response message from the service layer may optionally include statistical information about the matching content—for example number of times an announced link attribute has been accessed, number of group operations targeting the AE, etc. The M2M server 1410 may use this to decide to which service layers to send the UpdateContactInfoReq. For instance, if a service layer has a group which includes AE1 and this group is rarely or never used, the M2M server 1410 may decide to forego updating the AE contact information.

In Step 3 of FIG. 16, M2M server 1410 builds an inventory of all service layers that have responded TRUE.

In Step 4 of FIG. 16, M2M server 1410 updates the contact information only in those service layers that are impacted by an AE mobility event.

Note that in an alternative implementation, the child service layers could assist the discovery by creating a new aeContactSummary parameter that includes a list of all AE contact information. This way, the M2M server 1410 need only search through the aeContactSummary parameter, rather than through the entire service layer. Every time the service layer observes a request that generates AE contact information, the service layer automatically saves a copy of this contact information in the aeContactSummary parameter. If the contact information is already there from a prior request, or if the AE has a service provider assigned AE_ID, the aeContactSummary resource need not be updated. If the AE contact information is no longer needed, say for instance an announced resource is deleted, the AE contact information may be deleted from the list. As another alternative, the M2M server 1410 may subscribe to be notified when there is a change in this aeContactSummary parameter. As a result, any time there is a change in the aeContactSummary parameter, the M2M server 1410 is notified. The notification message may contain the AE contact information that has been created, modified, or deleted.

It is understood that the entities performing the steps illustrated in FIG. 16 may be logical entities that may be implemented in the form of software (i.e., computer-executable instructions) stored in a memory of, and executing on a processor of, an apparatus configured for wireless and/or network communications or a computer system such as those illustrated in FIG. 23C or FIG. 23D. That is, the method(s) illustrated in FIG. 16 may be implemented in the form of software (i.e., computer-executable instructions) stored in a memory of an apparatus, such as the apparatus or computer system illustrated in FIG. 23C or FIG. 23D, which computer executable instructions, when executed by a processor of the apparatus, perform the steps illustrated in FIG. 16. It is also understood that the functionality illustrated in FIG. 16 may implemented as a set of virtualized network functions. The network functions may not necessarily communicate directly, rather, they may communicate via forwarding or routing function. It is also understood that any transmitting and receiving steps illustrated in FIG. 14 may be performed by communication circuitry of the apparatus under control of the processor of the apparatus and the computer-executable instructions (e.g., software) that it executes.

Figure 17:
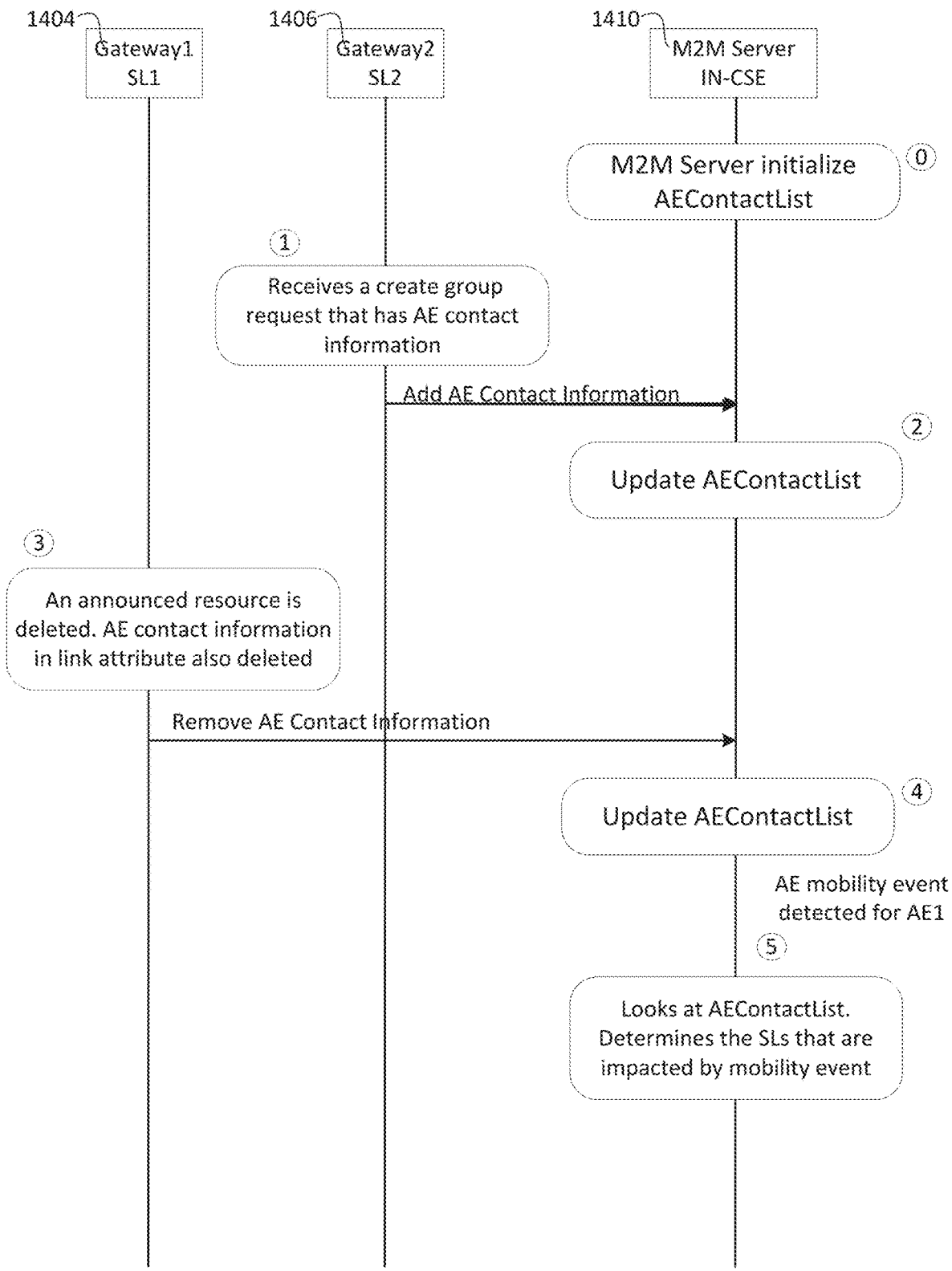
FIG. 17 is a diagram that illustrates a Master List at M2M Server.

An M2M server may maintain a list of SLs that are impacted by AE contact information changes. In this option, a master list of child service layers and associated AE contact information is kept at the M2M server 1410. The child service layers are responsible for keeping this master list up to date. A typical call flow showing the interaction between the child service layer and M2M server 1410 is shown in FIG. 17. As in previous section, it is assumed that the AE1 (with resource name: thermoControl and resource ID: TC001) is originally registered with service layer1 (with CSE-ID CSE001) and after the mobility event, the AE1 is registered with service layer2 (with CSE-ID CSE002).

In Step 0 of FIG. 17, it is assumed that the M2M server 1410 already has initialized a parameter aeContactList, that is used to keep the master list of AE contact information. For example this parameter could be implemented as a resource on the M2M Server 1410. The information stored in this parameter is a list if AE contact information per child service layer In Step 1 of FIG. 17, a child service layer in Gateway 2, receives a request that has AE contact information. The child service layer sends an 'add' AE contact information request to the M2M server 1410.

In Step 2 of FIG. 17, the M2M server 1410 extracts the AE contact information from the request, and updates the appropriate entry in the aeContactList. The request may contain more than one AE contact information, for instance if the request in Step 1 was a group creation with multiple AEs as member IDs.

At some later time, child service layer 1 in Gateway1 deletes an announced resource. The resource had AE contact information.

In Step 3 of FIG. 17, child service layer 1 sends a 'remove' AE contact information request to the M2M server 1410.

In Step 4 of FIG. 17, the M2M server 1410 extracts the AE contact information from the request and removes the corresponding entry from the aeContactList. At any point in time, the M2M server 1410 has a complete view of all child service layers that are impacted by an AE mobility event. For example, a sample aeContactList for a oneM2M deployment is shown in Table 1.

TABLE 1

Example aeContactList

| Child service layer (service layer ID) | List of AE contact information |
| --- | --- |
| CSE001 | /CSE003/./AE001/container1, /CSE0010/./AE002/, /CSE002/./AE003/container3 |
| CSE002 | /CSE0011/CSEbase/App1 |
| CSE004 | /CSE001/./AE5/subscription, /CSE001/TC001 |
| CSE008 | /CSE001./AE01/container1, /CSE0020/./AE02, /CSE0044/./AE05/container4/instance4 |
| CSE009 | /CSE003/serviceLayerRoot/application1, CSE001/TC001 |

In Step 5 of FIG. 17, M2M server 1410 knows that an AE mobility event has occurred for AE1. Owing to this AE mobility event, the AE contact information /CSE001/TC001 is stale, and needs to be changed to /CSE002/TC001. M2M server 1410 looks at the aeContactList and determines the service layers impacted by this mobility event. For the example shown in Table 1, the two CSEs impacted have IDs CSE004 and CSE009. M2M sever sends the UpdateContactInfoReq only to these impacted service layers.

It should be appreciated that it is also possible that an entity subscribe to be notified about changes to the aeContactList parameter. The subscription may be for changes within the entire service provider domain, or for changes to AE contact information of a specific child service layer.

It should be appreciated that the entities performing the steps illustrated in FIG. 17 may be logical entities that may be implemented in the form of software (i.e., computer-executable instructions) stored in a memory of, and executing on a processor of, an apparatus configured for wireless and/or network communications or a computer system such as those illustrated in FIG. 23C or FIG. 23D. That is, the method(s) illustrated in FIG. 17 may be implemented in the form of software (i.e., computer-executable instructions) stored in a memory of an apparatus, such as the apparatus or computer system illustrated in FIG. 23C or FIG. 23D, which computer executable instructions, when executed by a processor of the apparatus, perform the steps illustrated in FIG. 17. It should also be appreciated that the functionality illustrated in FIG. 17 may implemented as a set of virtualized network functions. The network functions may not necessarily communicate directly, rather, they may communicate via forwarding or routing function. It should further be appreciated that any transmitting and receiving steps illustrated in FIG. 17 may be performed by communication circuitry of the apparatus under control of the processor of the apparatus and the computer-executable instructions (e.g., software) that it executes.

The child service layers may create a subscription at an M2M server that may send out notifications when there is an AE mobility event. In the first two options the general approach relies on having the M2M server 1410 find out the SLs that need to be informed about an AE mobility event and then sending new AE contact information to these SLs. In this third option, the SLs subscribe to be informed if there is new AE contact information In this option, the child service layer relies on the subscription mechanism to be notified when there is an AE mobility event. A sample call flow is depicted in FIG. 18.

Figure 18:
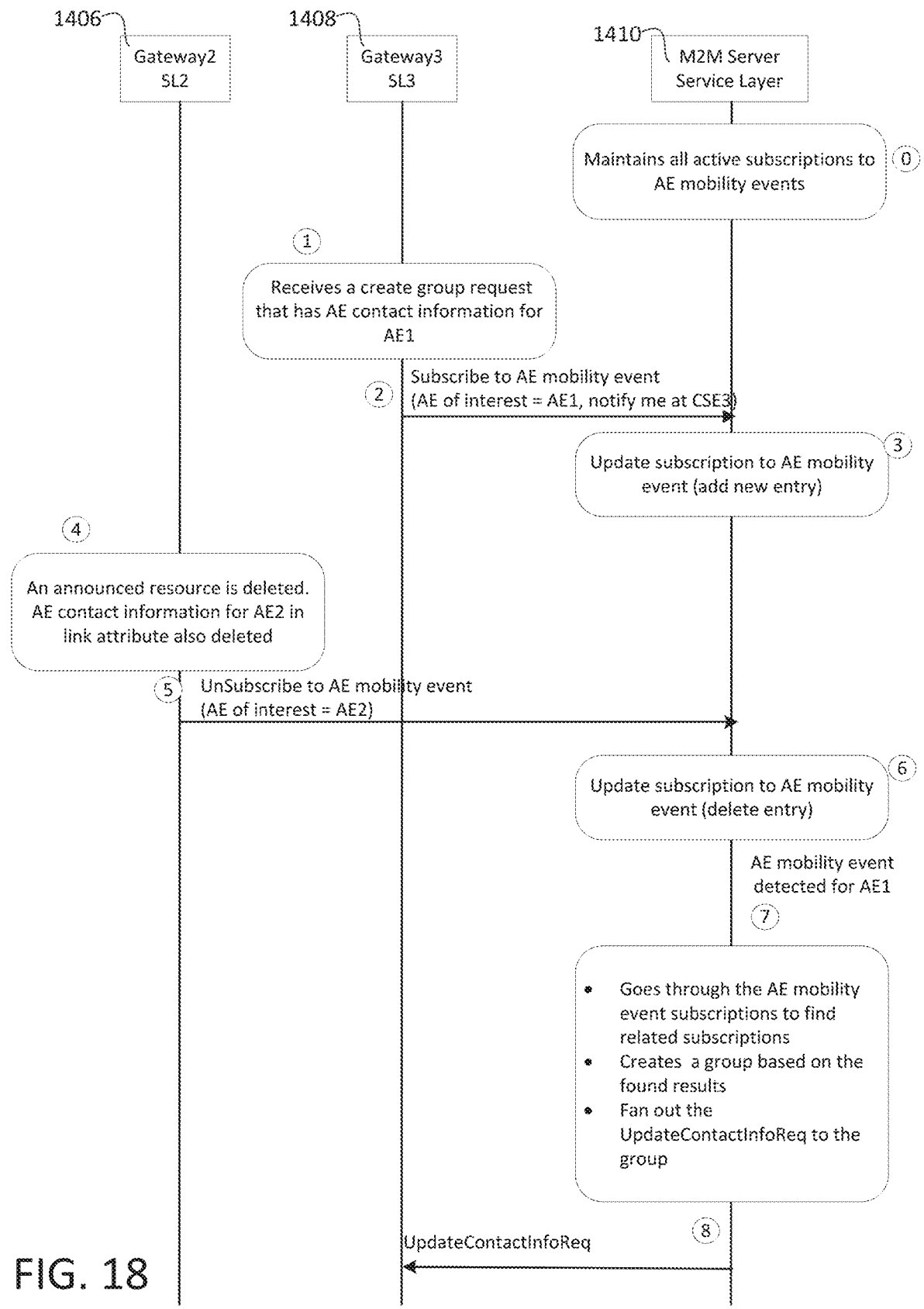
FIG. 18 is a diagram that illustrates a Subscribe to AE Mobility Event.

In Step 0 of FIG. 18, initially it is assumed that the M2M server 1410 maintains all active subscriptions to AE mobility events. This mechanism is slightly different from the subscription mechanism defined in oneM2M, as it is not necessarily tied to some event occurring on a resource. Rather it is tied to an event that may be observed at the M2M server 1410. Each subscription contains the address of the service layer that made the request, and AE contact information of the AE that is being monitored.

In Step 1 of FIG. 18, Service Layer 3 receives a request that has AE contact information for AE1. In the example shown, this request is group creation request.

In Step 2 of FIG. 18, Service layer 3 subscribes to be notified of AE mobility events for AE1. It also provides the address where it wants to be informed about possible mobility events.

In Step 3 of FIG. 18, M2M server 1410 updates its subscription information for AE mobility events.

In Step 4 of FIG. 18, sometime later, an announce resource is deleted at service layer 2. The announce resource had a link attribute pointing back to AE2.

In Step 5 of FIG. 18, Gateway2 service layer (SL2 1406) asks the M2M server 1410 to unsubscribe it from the AE monitoring event.

In Step 6 of FIG. 18, M2M server 1410 updates its subscription information, deleting the subscription.

In Step 7 of FIG. 18, a mobility event occurs for AE1. The M2M server 1410 may use one of the methods in FIGS. 14 and 15 to determine that this event occurs. The M2M server 1410 may then go through all its subscriptions to find those related to AE1. Any subscription related to AE1, is to be notified of the AE mobility event. If the M2M server 1410 finds multiple service layers that need to be notified, it may create a group with these members, and fan out the UpdateContactInfoReq.

It should be appreciated that the entities performing the steps illustrated in FIG. 18 may be logical entities that may be implemented in the form of software (i.e., computer-executable instructions) stored in a memory of, and executing on a processor of, an apparatus configured for wireless and/or network communications or a computer system such as those illustrated in FIG. 23C or FIG. 23D. That is, the method(s) illustrated in FIG. 18 may be implemented in the form of software (i.e., computer-executable instructions) stored in a memory of an apparatus, such as the apparatus or computer system illustrated in FIG. 23C or FIG. 23D, which computer executable instructions, when executed by a processor of the apparatus, perform the steps illustrated in FIG. 18. It should also be appreciated that the functionality illustrated in FIG. 18 may implemented as a set of virtualized network functions. The network functions may not necessarily communicate directly, rather, they may communicate via forwarding or routing function. It should further be appreciated that any transmitting and receiving steps illustrated in FIG. 18 may be performed by communication circuitry of the apparatus under control of the processor of the apparatus and the computer-executable instructions (e.g., software) that it executes.

EMBODIMENTS

Figure 22:
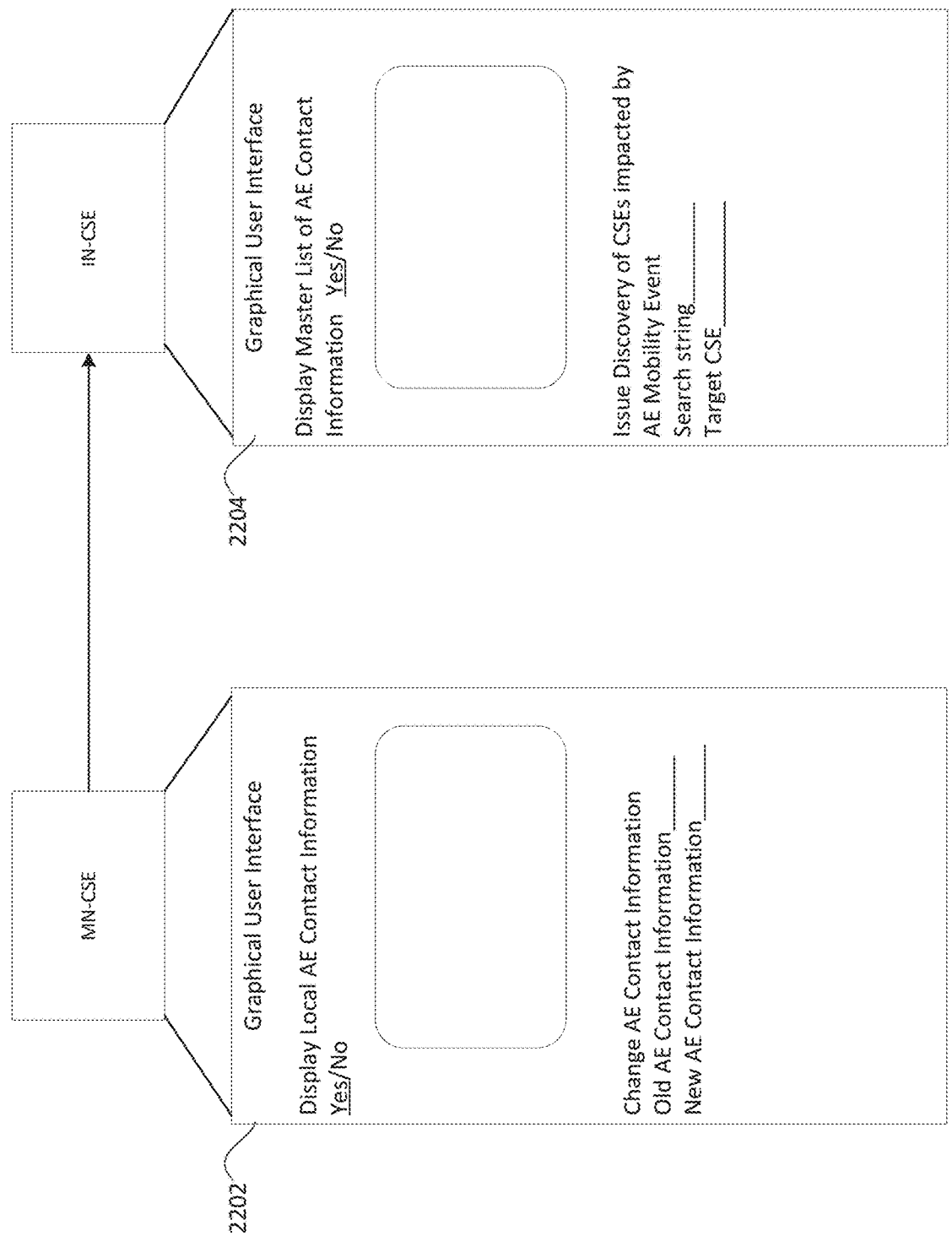
FIG. 22 is a diagram that illustrates a Graphical User Interface for CSEs.

This section describes embodiments for implementing the methods/enhancements described herein to the oneM2M architecture. In addition, a user interface is also included in FIG. 22 to display and/or configure related parameters and information.

oneM2M Embodiment

The new functionality described herein may be implemented in a new mobility (MOB) CSF 1902, which handles AE mobility events and possibly other mobility scenarios that may affect the oneM2M layer.

The Mobility CSF 1902 may be found in the IN-CSE as well as MN-CSEs and ASN-CSEs. This new MOB 1902 supports procedures and processes among the M2M server 1410 and child service layers as described in above. The resources and procedures related to the Service Layer will be implemented in a CSE.

Alternatively, the new functionality described herein may be implemented in an existing CSF—for example the Discovery, Registration, or Location CSFs.

Figure 19:
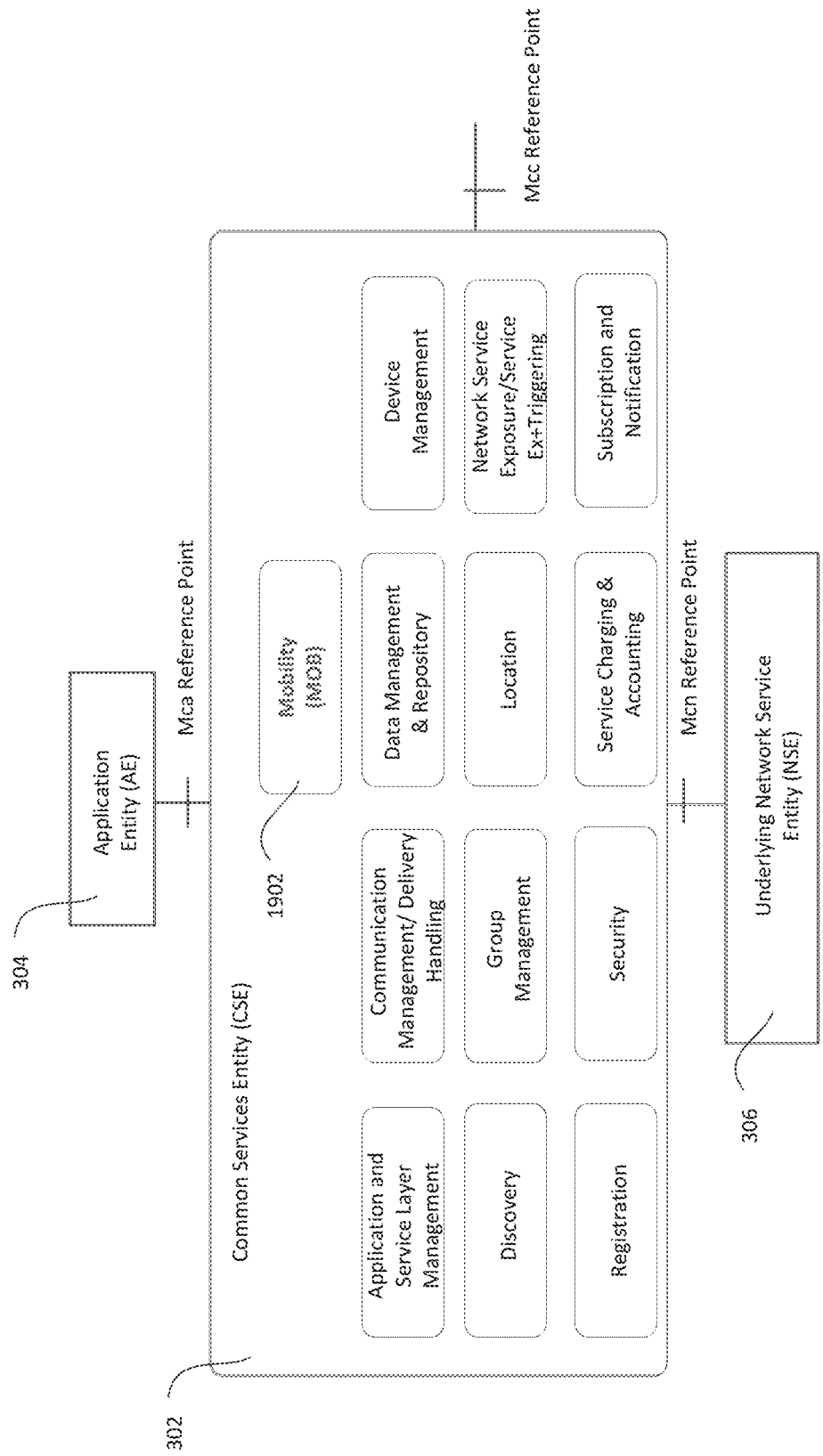
FIG. 19 is a diagram that illustrates New Mobility (MOB) CSF.

It should be appreciated that the functionality illustrated in FIG. 19, may be implemented in the form of software (i.e., computer-executable instructions) stored in a memory of, and executing on a processor of, a wireless device or other apparatus (e.g., a server 1410, gateway, device, or other computer system), such as one of those illustrated in FIG. 23C or 23D described below. It should also be appreciated that the functionality illustrated in FIG. 19 may implemented as a set of virtualized network functions. The network functions may not necessarily communicate directly, rather, they may communicate via forwarding or routing function.

Mapping UpdateContactInfoReq

Using Notify Request

The UpdateContactInfoReq message described above may be implemented through a NOTIFY operation. The To parameter may be set to the CSE that is being contacted. For example, this may be:
1) resourceID of <CSEbase> resource,
2) hierarchical address of <CSEbase> resource,
3) pointOfAccess of CSE (IP address and port, or FQDN) published by CSE in its pointOfAccess The Content parameter may include the updated contact information. For example, it may include Old AE Contact information and/or New AE Contact information.

More than one form of the contact information may be included. For instance the contact information may be in the form of resource names (/MN-CSE001/CSEBase/App- Name), or in the form of resource IDs (/MN-CSE001/ AE00001), or in the form of an absolute URI (IP address/ port, FQDN, etc.) of the AE.

In addition, the request may also include an optional requestCause parameter, which informs the receiver about the reason the request was issued. Possible values for this parameter may include, for example:
  AE Mobility Event: The originator has issued this request due a detected AE mobility event.

The basic operation is as defined in Section 10.1.5 of oneM2M-TS-0001, oneM2M Functional Architecture-V-2.6.0, herein incorporated by reference in its entirety. The details of Step 003 of that procedure are modified below:
  For an MN-CSE or ASN-CSE,
  The CSE searches in notificationTargets attribute of <subscription> resources, memberIDs attribute in <group> resources, and link attribute in announced resources, for URIs that match the supplied Old AE Contact Information; and
  CSE replaces the URI in the found attributes, with the new AE contact Information.
  For an IN-CSE,
  The IN-CSE triggers the AE Mobility Event handling procedure.

Using UPDATE Request

The UpdateContactInfoReq message described herein may be implemented through an UPDATE operation to a CSE virtual resource contactInfoChange. The Content parameter may include the updated contact information, it may include Old AE Contact information and/or New AE Contact information.

More than one form of the contact information may be included. For instance the contact information may be in the form of resource names (/MN-CSE001/CSEBase/App- Name), or in the form of resource IDs (/MN-CSE001/ AE00001), or in the form of an absolute URI (IP address/ port, FQDN, etc) of the AE.

In addition, the request may also include an optional requestCause parameter, which informs the receiver about the reason the request was issued. Possible values for this parameter include, for example:
  AE Mobility Event: The originator has issued this request due a detected AE mobility event.

The basic operation is as defined in Section 10.1.5 of oneM2M-TS-0001, oneM2M Functional Architecture-V-2.6.0, herein incorporated by reference in its entirety. The details of Step 003 of that procedure are modified below:
  For an MN-CSE or ASN-CSE,
  The CSE searches in notificationTargets attribute of <subscription> resources, memberIDs attribute in <group> resources, and link attribute in announced resources, for URIs that match the supplied Old AE Contact Information: and
  CSE replaces the URI in the found attributes, with the new AE contact Information.
  For an IN-CSE,
  The IN-CSE triggers the AE Mobility Event handling procedure.

Modifications to AE Registration Request

As part of the AE registration procedure, the AE issues a CREATE request to the Registrar CSE. The request may include the following optional parameters: Initial Registration, Local Registration, and Current Registrar CSE.

Initial Registration:

Optional parameter applicable to AE or CSE registration request. If set to TRUE, Receiver CSE treats the CREATE operation as an initial registration from the Originator. For example this may occur when an Originator is pre-provisioned with an AE-ID or CSE-ID. If set to FALSE or NULL, Receiver CSE treats the CREATE operation as a re-registration request.

Local Registration:

Optional parameter applicable to AE registration request. If set to TRUE. Receiver CSE will not take any proactive action when an AE mobility event is detected. If set to FALSE or NULL, the Receiver CSE will assist the AE when the AE undergoes an AE mobility event. For example, it may notify the IN-CSE that a mobility event has occurred.

Current Registrar CSE:

Optional parameter applicable to an AE or CSE. registration request. Set by the Originator to the CSE-ID of the current Registrar CSE. If the Receiver CSE is different from the supplied CSE-ID, then this indicates to the Receiver CSE that this is a re-registration request, and it provides the Registrar CSE the CSE-ID of the CSE where the Originator was previously registered.

New Attribute for Announce Resource

As part of the description with respect to FIG. 14, it was described that after an AE re-registers with a new registrar CSE and announces its presence to the IN-CSE, the IN-CSE will have two announced resources—one for the old registration and one for the new registration. As there may be instances where it would be useful to keep the old announcement (say the AE moves back to the original CSE), it was suggested that the announced resource be maintained, but put into a "disable" state. In order to implement this, a new status attribute may be introduced in the announce resource, as shown in bold in Table 2.

TABLE 2

Universal Attributes for Announced Resources (excerpted from oneM2M-TS-0001, oneM2M Functional Architecture-V-2.6.0)

| Attributes Name | Mandatory/ Optional | Description |
| --- | --- | --- |
| resourceType | Mandatory | Resource Type. As specified in clause 9.2, a suffix of "Annc" to the name of the original resource type shall be used to indicate the name for the associated announced resource type. |
| resourceID | Mandatory | Identifies the resource at the remote CSE |
| resourceName | Mandatory | See clause 9.6.1.3 for information on this attribute |
| parentID | Mandatory | Identifies the parent resource at the remote CSE. |
| creationTime | Mandatory | See clause 9.6.1.3 for information on this attribute. |
| lastModifiedTime | Mandatory | See clause 9.6.1.3 for information on this attribute. |
| expirationTime | Mandatory | See clause 9.6.1.3.2 for information on this attribute. This attribute cannot exceed the value received from the original resource but it can be overridden by the policies of the remote CSE hosting the announced resource. |
| link | Mandatory | Provides the URI to the original resource. |
| status | Mandatory | Provides the status of the announcement (either enabled or disabled). It is set to enabled by default upon announce resource creation. If set to disabled, the announced resource is maintained, but not used for discovery purposes. |

New Filter Criteria for Discovery

As part of the description with respect to FIG. 16, it was described that a CSE may issue discovery request to find all matches to AE contact information (for instance in announce link attributes, in group member IDs, or in notification targets). In order to implement this, a new filter criteria is introduced to signal to the receiving CSE that the search needs to be done through all its AE contact information. It is shown in bold in Table 3.

TABLE 3

Filter Criteria conditions

| Condition tag | Multiplicity | Matching condition |
| --- | --- | --- |
| createdBefore | 0 . . . 1 | The creationTime attribute of the resource is chronologically before the specified value. |
| createdAfter | 0 . . . 1 | The creationTime attribute of the resource is chronologically after the specified value. |
| modifiedSince | 0 . . . 1 | The lastModifiedTime attribute of the resource is chronologically after the specified value. |
| unmodifiedSince | 0 . . . 1 | The lastModifiedTime attribute of the resource is chronologically before the specified value. |
| stateTagSmaller | 0 . . . 1 | The stateTag attribute of the resource is smaller than the specified value. |
| stateTagBigger | 0 . . . 1 | The stateTag attribute of the resource is bigger than the specified value. |
| expireBefore | 0 . . . 1 | The expirationTime attribute of the resource is chronologically before the specified value. |

TABLE 3-continued

| Filter Criteria conditions | | |
|---|---|---|
| Condition tag | Multiplicity | Matching condition |
| *expireAfter* | 0 . . . 1 | The *expirationTime* attribute of the resource is chronologically after the specified value. |
| *labels* | 0 . . . n | The *labels* attributes of the resource matches the specified value. |
| *resourceType* | 0 . . . n | The *resourceType* attribute of the resource is the same as the specified value. It also allows differentiating between normal and announced resources. |
| *sizeAbove* | 0 . . . 1 | The *contentSize* attribute of the <*contentInstance*> resource is equal to or greater than the specified value. |
| *sizeBelow* | 0 . . . 1 | The *contentSize* attribute of the <*contentInstance*> resource is smaller than the specified value. |
| *contentType* | 0 . . . n | The *contentInfo* attribute of the <*contentInstance*> resource matches the specified value. |
| *limit* | 0 . . . 1 | The maximum number of resources to be returned in the response. This may be modified by the Hosting CSE. When it is modified, then the new value shall be smaller than the suggested value by the Originator. |
| *aeContactInfo* | 0 . . . n | The AE contact information matches the specified value |
| . | . | . |
| . | . | . |
| . | . | . |

The root of the search may be set to the CSEbase of the target CSE, if no other information is available to the Originator to reduce the scope of the search.

New Attribute for <AE> Resource

As part of the description with respect to FIG. 14, it was described that after an AE re-registers with a new registrar CSE and announces its presence to the IN-CSE, the IN-CSE may delete or disable the original <AE> resource. As there may be instances where it would be useful to keep the old <AE> resource (say the AE moves back to the original CSE), it was suggested that the announced resource be maintained, but put into a "disable" state. While in this state, the CSE maintains all context tied to this resource, and may allow only RETRIEVE operations on this resource. Any other operation targeting this resource is rejected with an unsuccessful Response Status Code. In addition, the content of the response message may contain additional error information (for instance 'disabled resource'). In order to implement this, a new status attribute may be introduced in the <AE> resource, as shown in bold in Table 4.

TABLE 4

Attributes for <AE> Resources (excerpted from oneM2M-TS-0001, oneM2M Functional Architecture-V-2.6.0)

| Attributes of <AE> | Multiplicity | RW/RO/ WO | Description | <AEAnnc> Attributes |
|---|---|---|---|---|
| *resourceType* | 1 | RO | See clause 9.6.1.3. | NA |
| *resourceID* | 1 | RO | See clause 9.6.1.3. Contains the AE-ID-Stem of the AE (see clause 7.2 on identifier formats and clause 10.1.1.2.2 for AE registration procedure). | NA |
| *resourceName* | 1 | WO | See clause 9.6.1.3. | NA |
| *parentID* | 1 | RO | See clause 9.6.1.3. | NA |
| . | . | . | . | . |
| . | . | . | . | . |
| . | . | . | . | . |
| *e2ESecurityCapabilities* | 0 . . . 1 | RW | See clause 9.6.1.3. | MA |
| *status* | 1 | RW | Provides the status of the <AE> resource (either enabled or disabled). It is set to enabled by default upon resource creation. If set to disabled by an IN-CSE, the resource is maintained, but any services on this resource (and its child resources) is suspended. This includes any actions related to subscriptions, groups, polling channel, time series, semantic descriptions, discovery, schedule, etc | NA |

Modifications to Subscription/Notification

As described with respect to FIG. 18, a CSE may subscribe to be notified when a specific AE mobility event occurs. As a result a CSE that knows that it has AE contact information for AE1, may subscribe to the IN-CSE, to be notified when there is an AE mobility event to AE1.

This may be accomplished by introducing one new attribute to the subscription resource, and by adding a new notification criteria.

New Event Notification Criteria for Subscription

The new event notification criteria allow CSE to monitor for specific events at a CSE that are not related to some change to the parent resource of the subscription resource, but to some action occurring at the CSE. In the context of the solution presented with respect to FIG. 18, the event is an AE Monitor Event. The <subscription> resource may be created under the <CSEbase> resource or one of the <node> child resources. The details are provided in the entries of Table 5 (the new entries are shown in bold).

TABLE 5 eventNotificationCriteria conditions

| Condition tag | Multiplicity | Matching condition |
|---|---|---|
| createdBefore | 0 . . . 1 | The *creationTime* attribute of the resource is chronologically before the specified value. |
| . | . | . |
| . | . | . |
| . | . | . |
| eventType | 0 . . . n | The type of event. Possible event type values are:<br>A. Update to attributes of the subscribed-to resource<br>B. Deletion of the subscribed-to resource,<br>C. Creation of a direct child of the subscribed-to resource,<br>D. Deletion of a direct child of the subscribed-to resource<br>E. An attempt to retrieve a <contentInstance> direct-child-resource of a subscribed-to <container> resource is performed while this <contentInstance> child resource is an obsolete resource or the reference used for retrieving this resource is not assigned. This retrieval is performed by a RETRIEVE request targeting the subscribed-to resource with the *Result Content* parameter set to either "child-resources" or "attributes + child-resources".<br>F. Self-subscription: This event type applies to notifications that are generated when the CSE needs to send an unsolicited request to the subscriber based on some other request or some event (event defined in eventMonitor attribute)<br>The other conditions in *eventNotificationCriteria conditions apply to the selected eventType*.<br>For example, if eventType is "Creation of a direct child of the subscribed-to resource" then other *eventNotificationCriteria* conditions is applied to the direct child resources of the subscribed-to resource.<br>If this condition is not specified, the default value is "Update to attributes of the subscribed-to resource".<br>The notion of "obsolete resource" is defined in clause 9.6.1.3.2 (Common attributes). |
| *eventMonitor* | 0 . . . n | **Events to be monitored by a CSE. This list is only applicable when *eventType* has a value F. Possible String arguments:<br>AE Mobility Event** |
| operationMonitor | 0 . . . n | The operations accessing the subscribed-to resource matches with the specified value. It allows monitoring which operation is attempted to the subscribed-to resource regardless of whether the operation is performed. This feature is useful when to find malicious AEs. Possible string arguments are: create, retrieve, update, delete. |
| . | . | . |
| . | . | . |
| *aeMobilityContactInfo* | . . n | **Indicates the AE Contact information that the originator is subscribing to have the receiving CSE monitor. This list is only applicable when *eventType* has a value of "AE Mobility Event".** |

TABLE 5-continued eventNotificationCriteria conditions

| Condition tag | Multiplicity | Matching condition |
|---|---|---|
| | | It is a list of URIs, potentially with wildcards. When provided, *eventType* = F, and *eventMonitor* = AE Mobility Event, it tells the receiving CSE that the subscription is for an AE mobility event that targets one of the AEs contained in this list. If such an event occurs, a notification should be sent to the *SubcriberURI*. |

New <aeContactSummary> Resource

The <aeContactSummary> resource supports the solution presented with respect to FIG. 16. It provides a list of AE Contact Information for this CSE. It is updated internally by the CSE every time a request creates or deletes AE Contact Information. The resource can be, for example:

discovered or retrieved by a remote-CSE;

announced/mirrored to a remote CSE; and/or subscribed-to by a remote CSE.

Figure 20:
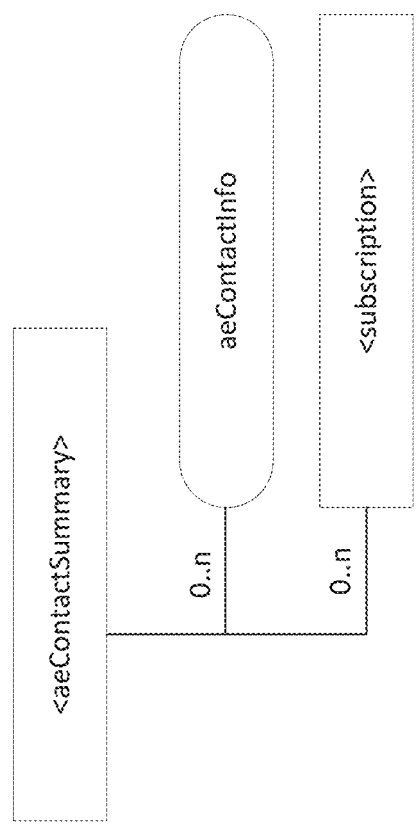
FIG. 20 is a diagram that illustrates a New <aeContactSummary> Resource.

This allows a remote CSE (typically an IN-CSE) to determine if the Hosting CSE is impacted by an AE mobility event. It may reside under CSEbase, and is depicted in FIG. 20. It has one attribute (aeContactInfo), defined in Table 6.

TABLE 6

Attribute of <aeContactSummary>

| Attributes of <aeContactSummary> | Multiplicity | RW/RO/WO | Description |
|---|---|---|---|
| aeContactInfo | 0 . . . 1(L) | RO | AE contact information - normally in the form of a URI |

<aeContactSummary> Resource Procedures

Operations including CREATE, RETRIEVE, UPDATE, and DELETE are allowed for <aeContactSummary> resource to realize the interactions described above.

Create <aeContactSummary>

As described above, creation of the <aeContactSummary> resource can only be done on a CSE implicitly when a first Registree AE registers to the Hosting CSE. This will create the <aeContactSummary> child resource under <CSEBase>.

The Hosting CSE can follow the procedure outlined below.

Step 001: The Receiver can:

1) Assign values to the resourceID and resourceName attributes of the <aeContactSummary> resource to be created.

2) Assign a value to the following common attributes specified in clause 9.6.1.3 of oneM2M-TS-0001, oneM2M Functional Architecture-V-2.6.0, herein incorporated by reference in its entirety:

a) parentID;

b) creationTime;

c) expirationTime: The Hosting CSE can assign a value that is consistent with the expirationTime of the <AE> resource that triggered the creation of the <aeContactSummary> resource.

d) lastModifiedTime: which is equals to the creationTime;

e) slateTag;

f) accessControlPolicyIDs: Populate with one ID of an <accessControlPolicy> that contains the following:

i) In the privileges attribute:

1) Allow RETRIEVE, UPDATE and DELETE operations to <aeContactSummary> resource being created to the Hosting CSE.

2) Allow RETRIEVE and DELETE operations to this <aeContactSummary> resource being created to the IN-CSE.

3) Assign any other RO (Read Only) attributes of <aeContactSummary> resource type within the restriction of the Receiver policies:

a) aeContactInfo: List of URIs that includes the AE contact information for the <AE> resource that triggered the creation of this <aeContactSummary> resource.

Step 002: The Receiver can create the <aeContactSummary> resource.

Retrieve <aeContactSummary>

This procedure can be used to retrieve attributes of a <aeContactSummary> resource (e.g. by the IN-CSE). The generic retrieve procedure is described in clause 10.1.2 in oneM2M-TS-0001, oneM2M Functional Architecture-V-2.6.0, herein incorporated by reference in its entirety.

TABLE 7

<aeContactSummary> RETRIEVE
<aeContactSummary> RETRIEVE

| Associated Reference Point | Mca, Mcc and Mcc' |
|---|---|
| Information in Request message | All parameters defined in table 8.1.2-3 in oneM2M-TS-0001, oneM2M Functional Architecture-V-2.6.0 apply with the specific details for: Content: void |
| Processing at Originator before sending Request | According to clause 10.1.2 in oneM2M-TS-0001, oneM2M Functional Architecture-V-2.6.0. |
| Processing at Receiver | According to clause 10.1.2 in oneM2M-TS-0001, oneM2M Functional Architecture-V-2.6.0 |
| Information in Response message | All parameters defined in table 8.1.3-1 in oneM2M-TS-0001, oneM2M Functional Architecture-V-2.6.0 apply with the specific details for: Content: attributes of the <aeContactSummary> resource |

TABLE 7-continued

| | <aeContactSummary> RETRIEVE <aeContactSummary> RETRIEVE |
|---|---|
| Associated Reference Point | Mca, Mcc and Mcc' |
| Processing at Originator after receiving Response | According to clause 10.1.2 in oneM2M-TS-0001, oneM2M Functional Architecture-V-2.6.0 |
| Exceptions | According to clause 10.1.2 in oneM2M-TS-0001, oneM2M Functional Architecture-V-2.6.0. |

Update <aeContactSummary>

As described above with respect to FIG. 16-18, updating of the <aeContactSummary> resource need not be supported. Changes in the attributes of a <aeContactSummary> resource can only be done by the Hosting CSE due to <AE> resources being created or deleted on the Hosting CSE. For each new <AE> resource, the Hosting CSE updates the aeContactInfo attribute as well as the expirationTime attribute (for example, setting it to the expirationTime of the <AE> resource with the furthest expiration time).

Delete <aeContactSummary>

This procedure can be used for deleting an existing <aeContactSummary> resource. Deletion of an existing <aeContactSummary> resource can terminate any further processing of AE contact information for the Hosting CSE.

TABLE 8

| | <aeContactSummary> DELETE <aeContactSummary>DELETE |
|---|---|
| Associated Reference Point | Mca, Mcc and Mcc'. |
| Information in Request message | All parameters defined in table 8.1.2-3 in oneM2M-TS-0001, oneM2M Functional Architecture-V-2.6.0 apply. |
| Processing at Originator before sending Request | According to clause 10.1.4.1 in oneM2M-TS-0001, oneM2M Functional Architecture-V-2.6.0 |
| Processing at Receiver | According to clause 10.1.4.1 in oneM2M-TS-0001, oneM2M Functional Architecture-V-2.6.0 |
| Information in Response message | According to clause 10.1.4.1 in oneM2M-TS-0001, oneM2M Functional Architecture-V-2.6.0 |
| Processing at Originator after receiving Response | According to clause 10.1.4.1 in oneM2M-TS-0001, oneM2M Functional Architecture-V-2.6.0 |
| Exceptions | According to clause 10.1.4.1 in oneM2M-TS-0001, oneM2M Functional Architecture-V-2.6.0 |

In addition, the Hosting CSE may implicitly delete the <aeContactSummary> resource when the last <AE> resource at the Hosting CSE is deleted.

New aeContactList Resource

Figure 21:
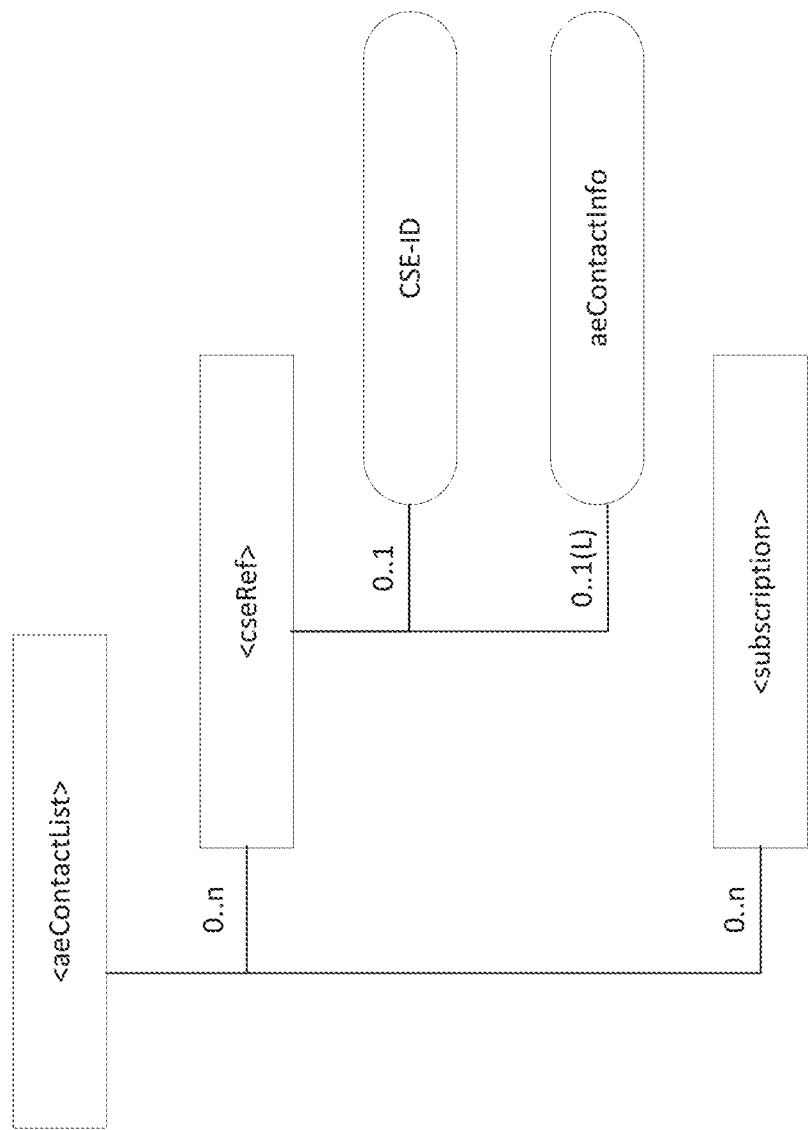
FIG. 21 is a diagram that illustrates a New <aeContactList> Resource.

The <aeContactList> resource supports the solution presented with respect to FIG. 17. It provides a list of AE Contact Information for all CSEs in the service provider domain. It is maintained only at the IN-CSE, and is updated when a CSE sends add/delete AE contact information request to the IN-CSE. It may reside under CSEbase, and is depicted in FIG. 21. It has one sub-resource (<cseRef>) for each CSE that has provided AE contact information. The <cseRef> has two attributes (CSE-ID and aeContactInfo), defined in Table 9.

TABLE 9

| Attribute of <cseRef> | | | |
|---|---|---|---|
| Attributes of <cseRef> | Multiplicity | RW/RO/ WO | Description |
| CSE-ID | 0 . . . 1 | RW | CSE-ID of CSE whose AE contact information is included in aeContactInfo |
| aeContactInfo | 0 . . . 1(L) | RW | AE contact information - normally in the form of a URI |

New CSE Attribute (descendentAEs)

As an alternative embodiment to using a NOTIFY or UPDATE operation to map the UpdateContactInfoReq, the information may be sent from the CSE to the IN-CSE implicitly through descendent CSE exchanges. The descendent CSEs of a CSE1 may refer to all child CSEs that are related to CSE1 through registration. If CSE3 is registered to CSE2 and CSE2 is registered to CSE1, then CSE2 and CSE3 are descendent CSEs of CSE1. As a result of registration between a registree CSE and a registrar CSE, a registrar CSE will maintain a <remoteCSE> resource for the registree CSE. This <remoteCSE> resource includes attributes of the registree CSE.

The descendent CSE exchange relies on registree CSEs to recursively push an attribute to their registrar CSE (through their <remoteCSE> resource). The attribute is pushed from one registree CSE to its registrar CSE, and then from that registrar CSE (acting as a registree CSE) to its registrar CSE, and so on, all the way until the attribute is pushed to the IN-CSE. For example, consider the case that CSE3 is registered to CSE2, CSE2 is registered to CSE1, and CSE1 is registered to IN-CSE. CSE3 updates the attribute in its <remoteCSE> resource in CSE2. CSE2 updates the attribute in its <remoteCSE> resource in CSE1, and CSE1 updates the attribute in its <remoteCSE> resource in the IN-CSE.

The proposed attribute is a descendentAEs attribute. This is a new attribute of the <CSE> resource and the <remoteCSE> resource. The attribute has multiplicity 0 . . . 1(L) and is readable/writable.

The attribute contains the AEContactList in the form of a set of (CSE ID, Application Entity Resource ID) pairs. The attribute is initialized when the <CSE> resource is created.

The attribute is modified when a service that has an Application Entity Resource ID is either started, updated, or deleted. For example, when a <subscription> resource has a notificationURI attribute containing an Application Entity Resource ID, or when a <group> resource has a member in the memberList attribute containing an Application Entity Resource ID, or when an announced resource has a link attribute pointing to an Application Entity Resource ID. The attribute is also modified when the descendentAEs attribute of a <remoteCSE> resource is modified.

When a service is started, a resource is created and if this contains a reference to an Application Entity Resource ID, the hosting CSE will include the (CSE ID, Application Entity Resource ID) pair in its descendentAEs attribute. The hosting CSE will also update the descendentAEs attribute of its <remoteCSE> resource on its registrar CSE.

When a service is stopped, a resource is deleted and if this resource contained a reference to an Application Entity Resource ID, the hosting CSE will delete the (CSE ID, Application Entity Resource ID) pair from its descendentAEs attribute. The hosting CSE will also update the descendentAEs attribute of its <remoteCSE> resource on its registrar CSE.

When a service is modified, the resource, tied to a service, is modified and if it has a reference to an Application Entity Resource ID that is added (or deleted), the hosting CSE will include (or remove) the (CSE ID, Application Entity Resource ID) pair in its descendentAEs attribute. The hosting CSE will also update the descendentAEs attribute of its <remoteCSE> resource on its registrar CSE.

When the descendentAEs attribute of a <remoteCSE> resource is changed, the registrar CSE will accordingly update the descendentAEs attribute of the <CSE> resource—removing/adding/modifying entries accordingly.

Every change in descendentAEs attribute in any CSE in the M2M/IoT system, is propagated to the IN-CSE. The descendentAEs attribute of the IN-CSE will have the complete AEContactList as presented with respect to FIG. 17.

Graphical User Interface

Interfaces, such as Graphical User Interfaces (GUIs) 2202 and 2204, can be used to assist user to control and/or configure functionalities related to mobility management of applications. User interfaces can be added to the CSEs to:

- monitor/display AE contact information results at Middle Nodes or end devices that support a service layer). This allows users to view aeContactSummary as defined with respect to FIG. 16 (for example, interface 2202);
- monitor/display AE contact information results for the entire service provider domain at the infrastructure node. This allows users to view aeContactList as defined with respect to FIG. 17 (for example, interface 2204);
- to discover CSEs that are impacted by an AE mobility event (this is at the infrastructure node);
- manually update AE contact information at a CSE (either Middle Nodes, end devices that support a service layer, or infrastructure nodes); and/or
- Trigger an MN-CSE to send an UpdateContactInfoReq to the IN-CSE (at a moddle node or an end device that supports a service layer).

It should be appreciated that interfaces 2202 and 2204 can be produced using displays such as those shown in FIGS. 23C-D described below.

Example Environment

FIG. 23A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Any of the client, proxy, or server devices illustrated in any of FIG. 2-4, 6-19, or 22 may comprise a node of a communication system, such as the ones illustrated in FIGS. 23A-D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 23A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 23A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 23B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 23B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 23B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 23C or FIG. 23D described below.

Further, the methods and functionalities described herein may be implemented as part of an M2M network that uses a Service Oriented Architecture (SOA) and/or a Resource-Oriented Architecture (ROA) to access services.

FIG. 23C is a block diagram of an example hardware/software architecture of a node of a network, such as one of the clients, servers, or proxies illustrated in FIG. 2-4, 6-19, or 22, which may operate as an M2M server, gateway, device, or other node in an M2M network such as that illustrated in FIGS. 23A and 23B. As shown in FIG. 23C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the mobility management of applications as described herein, e.g., in relation to the methods described in reference to FIGS. 6A-B, 7, 8, and 13-18, or the data structures of FIGS. 1-6B, 10-12, and 19-21, Tables 1-9, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 23C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected.

In particular, the processor 32 may control the communication circuitry in order to perform the transmitting and receiving steps described herein (e.g., in FIGS. 6A-B, 7, 8, and 13-18, and 25) and in the claims. While FIG. 23C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 23C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of a node or configure a node, and in particular underlying networks, applications, or other services in communication with the node. In one embodiment, the display/indicators 42 may present the graphical user interface illustrated in FIG. 25 and described herein.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

FIG. 23D is a block diagram of an exemplary computing system 90 which may also be used to implement one or more nodes of a network, such as the clients, servers, or proxies illustrated in FIG. 2-4, 6-19, or 22 and described herein, which may operate as an M2M server, gateway, device, or other node in an M2M network such as that illustrated in FIGS. 23A and 23B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 25 and its accompanying description.

Further, computing system 90 may contain communication circuitry, such as for example a network adaptor 97, that may be used to connect computing system 90 to an external communications network, such as network 12 of FIG. 23A-D, to enable the computing system 90 to communicate with other apparatuses of the network. The communication circuitry, alone or in combination with the CPU 91, may be used to perform the transmitting and receiving steps described herein (e.g., in FIG. 1, 3, 5-8, 11-15, 20-21, 24, or 25) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor and a memory, the apparatus further including computer-executable instructions stored in the memory of the apparatus which, when executed by the processor of the apparatus, cause the apparatus to:
   receive a mobility event message, the mobility event message comprising an indication an application entity (AE) has undergone a mobility event and further comprising updated AE contact information for the AE;
   assign the updated AE contact information to the AE for services targeting the AE;
   determine one or more service layers affected by the AE mobility event; and
   transmit, to the one or more service layers, a notification message comprising a notification of the AE mobility event.

2. The apparatus of claim 1, wherein the updated AE contact information is a URI that identifies the AE.

3. The apparatus of claim 1, wherein the notification message comprises old AE contact information for the AE and the updated AE contact information.

4. The apparatus of claim 1, wherein the determining comprises:
   querying a master list of AE contact information.

5. The apparatus of claim 4, wherein the master list comprises a plurality of entries wherein each entry comprises a node and AE contact information used by services on the node.

6. The apparatus of claim 1, wherein the apparatus is an M2M server.

7. The apparatus of claim 1, wherein the services comprise at least one of a subscription/notification service, an announcement service, and a group service.

8. The apparatus of claim 1, wherein the transmitting the notification message is performed via a NOTIFY request.

9. The apparatus of claim 1, wherein the mobility event message is a registration request from the AE, and wherein the instructions further cause the apparatus to transmit, to an M2M server, the notification message.

10. The apparatus of claim 9, wherein the registration request includes an identifier of a service layer the AE was previously connected through.

11. The apparatus of claim 9, wherein the instructions, when executed, further cause the apparatus to:
receive, from the M2M server, a confirmation of the AE mobility event.

12. The apparatus of claim 9, wherein the registration request comprises an indication to track AE mobility events for the AE.

13. The apparatus of claim 12, wherein the indication to track AE mobility events for the AE comprises a flag.

14. The apparatus of claim 9, wherein the message transmitted to the M2M server is an UPDATE or CREATE of an <AEannc> resource.

15. The apparatus of claim 9, wherein the apparatus is a device hosting a service layer.

16. The apparatus of claim 9, wherein the updated AE contact information comprises a URI identifying the AE.

17. The apparatus of claim 1, wherein the mobility event message comprises old AE contact information of an AE and new AE contact information of the AE, and wherein the instructions further cause the apparatus to:
monitor services that rely on AE contact information;
transmit, to a server, a notification of a change in these monitored services; and
update monitored services relying on the old AE contact information with the new AE contact information.

18. The apparatus of claim 17, wherein the change may correspond to a creation of a service, a modification of a service, a deletion of a service, or any combination thereof.

19. The apparatus of claim 17, wherein the monitored services comprise at least one of a subscription/notification service, an announcement service, and a group service.

20. The apparatus of claim 17, wherein the apparatus is a device hosting a service layer.

* * * * *